US 8,844,489 B2

(12) United States Patent
Fujita et al.

(10) Patent No.: US 8,844,489 B2
(45) Date of Patent: Sep. 30, 2014

(54) ROLLER FOLLOWER, VALVE TRAIN, INDUCTION HARDENING APPARATUS, METHOD OF HEAT TREATMENT OF SHAFT MEMBER, METHOD OF MANUFACTURING SHAFT, AND SHAFT

(75) Inventors: Takumi Fujita, Kuwana (JP); Kousuke Obayashi, Iwata (JP)

(73) Assignee: NTN Corporation, Osaka (JP)

( * ) Notice: Subject to any disclaimer, the term of this patent is extended or adjusted under 35 U.S.C. 154(b) by 126 days.

(21) Appl. No.: 12/735,815

(22) PCT Filed: Feb. 10, 2009

(86) PCT No.: PCT/JP2009/052208
§ 371 (c)(1),
(2), (4) Date: Aug. 19, 2010

(87) PCT Pub. No.: WO2009/104498
PCT Pub. Date: Aug. 27, 2009

(65) Prior Publication Data
US 2010/0319642 A1 Dec. 23, 2010

(30) Foreign Application Priority Data

Feb. 19, 2008 (JP) ................. 2008-037681
Oct. 3, 2008 (JP) ................. 2008-258557

(51) Int. Cl.
| F01L 1/14 | (2006.01) |
| C21D 6/00 | (2006.01) |
| F16C 33/62 | (2006.01) |
| C21D 9/40 | (2006.01) |
| C21D 6/04 | (2006.01) |
| F01L 1/16 | (2006.01) |
| C22C 38/36 | (2006.01) |
| F16C 33/34 | (2006.01) |
| F16C 19/46 | (2006.01) |
| C21D 1/25 | (2006.01) |
| C21D 6/02 | (2006.01) |
| F01L 1/18 | (2006.01) |
| C23C 8/00 | (2006.01) |
| C21D 1/10 | (2006.01) |
| C21D 1/42 | (2006.01) |

(52) U.S. Cl.
CPC ............... *F16C 19/46* (2013.01); *C21D 6/002* (2013.01); *F01L 2101/00* (2013.01); *C21D 1/10* (2013.01); *F01L 1/14* (2013.01); *F01L 2103/00* (2013.01); *F16C 33/62* (2013.01); *C21D 9/40* (2013.01); *C21D 6/04* (2013.01); *F01L 1/16* (2013.01); *C22C 38/36* (2013.01); *F01L 2105/00* (2013.01); *F16C 33/34* (2013.01); *C21D 1/42* (2013.01); *C21D 1/25* (2013.01); *C21D 6/02* (2013.01); *F01L 2105/02* (2013.01); *F01L 1/18* (2013.01)
USPC .................. 123/90.51; 384/482; 148/206

(58) Field of Classification Search
USPC ........................................ 123/90.51
See application file for complete search history.

(56) References Cited

U.S. PATENT DOCUMENTS

| 4,702,767 A * | 10/1987 | Takata et al. ................ 75/10.16 |
| 5,108,491 A * | 4/1992 | Matsumoto et al. ............ 75/242 |
| 5,361,648 A * | 11/1994 | Murakami et al. ............ 74/569 |
| 5,778,530 A * | 7/1998 | Nakamura et al. ............ 29/888.1 |
| 6,832,854 B2 * | 12/2004 | Umekawa et al. ............ 384/544 |
| 7,396,422 B2 * | 7/2008 | Miyauchi .................... 148/334 |
| 7,594,762 B2 * | 9/2009 | Watanabe et al. ............ 384/618 |
| 7,614,374 B2 * | 11/2009 | Watanabe et al. ............ 123/90.39 |
| 2003/0063829 A1 * | 4/2003 | Tamada et al. ................ 384/621 |
| 2003/0123770 A1 * | 7/2003 | Fujita et al. .................. 384/569 |
| 2005/0084194 A1 * | 4/2005 | Tamada et al. ................ 384/618 |
| 2006/0013520 A1 * | 1/2006 | Tamada et al. ................ 384/565 |
| 2008/0006347 A1 * | 1/2008 | Kizawa et al. ................ 148/233 |
| 2008/0035246 A1 * | 2/2008 | Kawamura et al. ........... 148/318 |
| 2008/0163839 A1 | 7/2008 | Watanabe et al. |
| 2010/0189385 A1 * | 7/2010 | Muramatsu .................... 384/492 |
| 2010/0319642 A1 * | 12/2010 | Fujita et al. .................. 123/90.44 |
| 2012/0010004 A1 * | 1/2012 | Muramatsu .................... 464/139 |

FOREIGN PATENT DOCUMENTS

| | | |
|---|---|---|
| CN | 1993561 A | 7/2007 |
| EP | 1484517 A2 | 12/2004 |
| EP | 1701052 A2 | 9/2006 |
| EP | 1788264 A1 | 5/2007 |
| JP | 02-102302 | 4/1990 |
| JP | U 05-032702 | 4/1993 |
| JP | 05-321616 | 12/1993 |
| JP | 2000-230544 | 8/2000 |
| JP | 2003-307223 | 10/2003 |
| JP | 2004-003627 | 1/2004 |
| JP | 2006-144889 A | 6/2006 |
| WO | WO 2006013696 A1 * | 2/2006 |

OTHER PUBLICATIONS

Extended European Search Report, issued in European Patent Application No. 09712949, dated Sep. 7, 2011.

Chinese Office Action, and English translation thereof, issued in Chinese Patent Application No. 200980105978.1 dated Mar. 26, 2013.

\* cited by examiner

*Primary Examiner* — Thomas Denion
*Assistant Examiner* — Steven D Shipe
(74) *Attorney, Agent, or Firm* — McDermott Will & Emery LLP

(57) ABSTRACT

A roller follower includes a roller ring, a shaft and a plurality of rollers. At least one of the roller ring, the shaft and the rollers is a steel member made of steel containing 0.7 to 2.4% carbon and 10.0 to 20.0% chromium, with remainder iron and impurities. In addition, carbide containing at least any one of iron and chromium as well as carbon and having an area of 12.6 $\mu m^2$ or greater is generated at an area ratio of 5.0% or higher, at a rolling contact surface of the steel member (a roller ring rolling contact surface, a shaft rolling contact surface and a roller rolling contact surface.

20 Claims, 28 Drawing Sheets

200 μm

60 μm

200 μm

60 μm

200 μm

60 μm

200 μm

60 μm

ROLLER FOLLOWER, VALVE TRAIN, INDUCTION HARDENING APPARATUS, METHOD OF HEAT TREATMENT OF SHAFT MEMBER, METHOD OF MANUFACTURING SHAFT, AND SHAFT

RELATED APPLICATIONS

This application is the U.S. National Phase under 35 U.S.C. §371 of International Application No. PCT/JP2009/052208, filed on Feb. 10, 2009, which in turn claims the benefit of Japanese Application No. 2008-037681, filed on Feb. 19, 2008 and Japanese Application No. 2008-258557, filed on Oct. 3, 2008, the disclosures of which Applications are incorporated by reference herein.

TECHNICAL FIELD

The present invention relates to a roller follower, a valve train, an induction hardening apparatus, a method of heat treatment of a shaft member, a method of manufacturing a shaft, and a shaft, and more particularly to a roller follower interposed between a rocker arm and a cam for opening and closing a valve of an engine and arranged in contact with the cam and a valve train including the roller follower, as well as a shaft that can be used as a shaft of the roller follower, an induction hardening apparatus that can be used for manufacturing a shaft, a method of heat treatment of a shaft member, and a method of manufacturing a shaft.

BACKGROUND ART

In general, an intake valve or an exhaust valve of an engine of a car and the like is opened and closed by a valve train for transmitting rotation of a cam rotating together with a camshaft and operating the valve. Here, for the purpose of suppressing loss of kinetic energy and occurrence of wear of parts due to friction, in some cases, a roller follower which is a plain bearing or a rolling bearing is arranged in a valve train at a portion coming in contact with an outer circumferential surface of the cam and receiving rotation of the cam. In this roller follower, occurrence of damage at a surface of an outer ring, an inner ring (a shaft) and rolling elements constituting the roller follower gives rise to a problem.

In order to address this, such measures as control of a state of stress or hardness at the surface of the outer ring, the inner ring (the shaft) and the rolling elements, surface treatment such as nitriding of the surface, and the like have been proposed. Thus, durability of the surface of the outer ring, the inner ring (the shaft) and the rolling elements constituting the roller follower could be improved to thereby improve durability of the roller follower (for example, see Japanese Patent Laying-Open No. 2000-230544 (Patent Document 1), Japanese Utility-Model Laying-Open No. 5-32702 (Patent Document 2), and Japanese Patent Laying-Open No. 2003-307223 (Patent Document 3)).

Patent Document 1: Japanese Patent Laying-Open No. 2000-230544
Patent Document 2: Japanese Utility-Model Laying-Open No. 5-32702
Patent Document 3: Japanese Patent Laying-Open No. 2003-307223

DISCLOSURE OF THE INVENTION

Problems to be Solved by the Invention

In recent years, however, with an engine achieving higher output and faster speed, further improvement in durability has been demanded in a roller follower. Considering such high performances as demanded in recent years, conventional measures including those as disclosed in Patent Documents 1 to 3 above cannot necessarily achieve sufficient improvement in durability of the roller follower.

In addition, in order to decrease the number of parts, a shaft such as a shaft of a roller follower is sometimes fixed to a member supporting the shaft by plastically working its end portion (caulking). In such a case, in addition to improvement in durability above, sufficient workability of the end portion of the shaft should be ensured.

From the foregoing, one object of the present invention is to provide a roller follower achieving sufficiently improved durability and a valve train. In addition, another object of the present invention is to provide a shaft that can be used as a shaft of the roller follower achieving sufficiently improved durability while ensuring sufficient workability of an end portion, as well as an induction hardening apparatus that can be used for manufacturing a shaft, a method of heat treatment of a shaft member, and a method of manufacturing a shaft.

Means for Solving the Problems

A roller follower according to one aspect of the present invention is a roller follower interposed between a rocker arm and a cam for opening and closing a valve of an engine and arranged in contact with the cam. This roller follower includes an outer ring having an annular shape, a shaft arranged such that a rolling contact surface formed on its outer circumferential surface is opposed to a rolling contact surface formed on an inner circumferential surface of the outer ring, and a plurality of rolling elements coming in contact, at a rolling contact surface formed on an outer circumferential surface thereof, with the rolling contact surfaces of the outer ring and the shaft and arranged on an annular raceway. At least any one of the outer ring, the shaft and the rolling elements is a steel member made of steel containing carbon not lower than 0.7 mass % and not higher than 2.4 mass % and chromium not lower than 10.0 mass % and not higher than 20.0 mass %, with remainder iron and impurities. In addition, carbide containing at least any one of iron and chromium as well as carbon and having an area of 12.6 $\mu m^2$ or greater is generated at an area ratio of 5.0% or higher, at the rolling contact surface of the steel member.

In addition, a roller follower according to another aspect of the present invention is a roller follower interposed between a rocker arm and a cam for opening and closing a valve of an engine and arranged in contact with the cam. This roller follower includes an outer ring having an annular shape, a shaft arranged such that a rolling contact surface formed on its outer circumferential surface is opposed to a rolling contact surface formed on an inner circumferential surface of the outer ring, and a plurality of rolling elements coming in contact, at a rolling contact surface formed on an outer circumferential surface thereof, with the rolling contact surfaces of the outer ring and the shaft and arranged on an annular raceway. At least any one of the outer ring, the shaft and the rolling elements is a steel member made of steel containing carbon not lower than 0.7 mass % and not higher than 2.4 mass % and chromium not lower than 10.0 mass % and not higher than 20.0 mass % as well as at least one element selected from the group consisting of silicon not higher than 3.5 mass %, manganese not higher than 1.25 mass %, nickel not higher than 2.5 mass %, molybdenum not higher than 10.0 mass %, and vanadium not higher than 5.2 mass %, with remainder iron and impurities. In addition, carbide containing at least any one of iron and chromium as well as carbon and having an area of 12.6 μm² or greater is generated at an area ratio of 5.0% or higher, at the rolling contact surface of the steel member.

The present inventors conducted detailed studies on a cause of occurrence of damages at the surface of the outer ring, the shaft (the inner ring) and the rolling elements constituting the roller follower. As a result, the following knowledge was acquired.

Namely, in general, the outer ring, the inner ring and the rolling elements constituting a bearing including a roller follower are often made of high-carbon chromium bearing steel such as SUJ2 defined under JIS, that has been subjected to quenching treatment, or of carburized steel (case hardened steel) such as SCM420 defined under JIS, that has been subjected to carburizing quenching treatment. Durability of a bearing is improved by improving durability of a rolling contact surface which is a surface of the outer ring and the inner ring coming in contact with the rolling elements or a surface of the rolling element coming in contact with the outer ring and the inner ring. Therefore, the rolling contact surface is subjected to treatment for generating compressive stress for the purpose of suppressing occurrence and development of a crack (such as surface hardening treatment through carburization or induction heating), and measures for suppressing generation of large-sized carbide (carbide of iron or chromium), which may become a stress concentration source and may accelerate occurrence and development of a crack, have been taken. In addition, if further improvement in durability is required, measures for increasing an amount of carbide at the rolling contact surface to increase hardness of the rolling contact surface may be adopted. In this case as well, a large amount of fine carbide is formed and formation of large-sized carbide which may accelerate occurrence and development of a crack is suppressed.

On the other hand, it was revealed as a result of studies conducted by the present inventors that, in an environment in recent years where a roller follower is used, durability of a bearing can be improved by intentionally forming large-sized carbide, rather than by decreasing stress concentration sources by suppressing formation of large-sized carbide at the rolling contact surface. More specifically, a roller follower is lubricated with oil in which soot particles resulting from combustion of fuel in an engine have been introduced. These soot particles enter the inside of the bearing together with the oil and cause wear of the rolling contact surface. Then, in an environment in recent years where a roller follower is used, damage of the rolling contact surface due to wear tends to progress in a shorter period of time than damage caused by a stress concentration source. Meanwhile, in a diesel engine or a direct-injection gasoline engine that has increasingly been adopted recently, an amount of generation of soot is particularly great and the tendency above is more noticeable.

Namely, regarding damages caused at the rolling contact surface of the roller follower in recent years, damages due to wear caused by introduction of soot particles is more dominant than damages at the rolling contact surface due to occurrence or the like of a crack caused by concentration of stress. Therefore, by forming large-sized carbide sufficiently greater than the soot particles and having high hardness at the rolling contact surface, durability of the roller follower can be improved.

To that end, in the roller follower according to one aspect and another aspect of the present invention, at least any one of the outer ring, the shaft and the rolling elements constituting the roller follower is a steel member having an appropriate component composition, and large-sized carbide having an area of 12.6 μm² or greater is generated at an area ratio of 5.0% or higher at the rolling contact surface. Consequently, according to the roller follower in one aspect and another aspect of the present invention, a roller follower in which damages due to wear caused by introduction of soot particles are suppressed and durability has sufficiently been improved can be provided.

Here, carbide is a compound containing at least any one of iron and chromium as well as carbon. An area ratio of carbide at the rolling contact surface can be determined, for example, as follows. Initially, the outer ring, the shaft and the rolling element constituting the roller follower are cut at a cross-section perpendicular to the rolling contact surface and the cross-section is polished. Thereafter, the polished cross-section is etched, for example, with aqua regia, and then five fields of 120 μm×100 μm including the rolling contact surface are observed with an SEM (Scanning Electron Microscope) and photographed. Those photograph images are analyzed with image analysis software and an area ratio of carbide having an area of 12.6 μm² or greater is calculated. For example, WinROOF manufactured by Mitani Corporation can be adopted as the image analysis software.

Here, if an area of carbide is smaller than 12.6 μm², the size thereof relative to soot particles is not sufficient and wear of the rolling contact surface caused by soot particles cannot effectively be suppressed. Even in an example where large-sized carbide equal to or greater than 12.6 μm² is present at the rolling contact surface, if the area ratio thereof is lower than 5.0%, a distance between carbides is great and wear of the rolling contact surface caused by soot particles cannot effectively be suppressed. Therefore, at the rolling contact surface, large-sized carbide having an area of 12.6 μm² or greater should be generated at an area ratio of 5.0% or higher. If the area of carbide exceeds 706.5 μm², a crack may occur with the carbide behaving as a stress concentration source even in an environment of use of a roller follower. Therefore, formation of carbide having an area exceeding 706.5 μm² is desirably suppressed. Specifically, when five fields of 120 μm×100 μm are examined with a method the same as the method of calculating the area ratio above, there is preferably one or less such carbide formed. Meanwhile, if the area ratio of carbide exceeds 40%, polishing of the rolling contact surface becomes difficult and it becomes difficult to ensure sufficient smoothness of the rolling contact surface. Therefore, the area ratio of carbide is preferably 40% or lower.

In order to further effectively suppress wear of the rolling contact surface caused by soot particles, carbide has an area preferably not smaller than 78.5 μm² and the carbide is desirably generated at the area ratio of 5% or higher. In addition, in order to further effectively suppress occurrence of a crack with carbide behaving as a stress concentration source, the number of carbides each having an area exceeding 530.7 μm² is preferably not more than one when five fields of 120 μm×100 μm are examined with a method the same as the method of calculating the area ratio above.

Detailed reason why a range of components in steel forming a steel member, which is at least any one of the outer ring, the shaft and the rolling element above, is limited to the above-described range will now be described.

Carbon: not lower than 0.7 mass % and not higher than 2.4 mass %

When carbon is less than 0.7 mass % in steel forming the steel member, a problem of too low an area ratio of carbide effectively acting on wear may arise. On the other hand, when carbon exceeds 2.4 mass %, a problem of excessive generation of large carbide behaving as a stress concentration source may arise. Therefore, carbon should be not lower than 0.7 mass % and not higher than 2.4 mass %. In order to further suppress the problems described above, carbon is preferably not lower than 0.9 mass % and not higher than 2 mass %.

Chromium: not lower than 10.0 mass % and not higher than 20.0 mass %

By adding chromium to steel forming the steel member, large-sized carbide is more readily formed. When chromium is less than 10.0 mass %, it becomes difficult to form large-sized carbide having an area not smaller than 12.6 $\mu m^2$ at a sufficient area ratio. On the other hand, when chromium exceeds 20.0 mass %, a problem of excessive generation of large carbide behaving as a stress concentration source may arise. Therefore, chromium should be not lower than 10.0 mass % and not higher than 20.0 mass %. In order to further facilitate formation of large-sized carbide having an area not smaller than 12.6 $\mu m^2$ at a sufficient area ratio, chromium is preferably not lower than 11 mass %. On the other hand, in order to further suppress the problem of excessive generation of large carbide behaving as a stress concentration source, chromium is preferably not higher than 19 mass %.

Silicon: not higher than 3.5 mass %

By adding silicon to steel forming the steel member, an effect of increase in hardness of a matrix at a high temperature is obtained. On the other hand, when silicon exceeds 3.5 mass %, such problems as graphitization of carbon and poor cold forging performance may arise. Therefore, silicon is preferably not higher than 3.5 mass %.

Manganese: not higher than 1.25 mass %

By adding manganese to steel forming the steel member, an effect of improvement in hardenability is obtained. On the other hand, when manganese exceeds 1.25 mass %, such problems as a crack and lowering in hardness due to excessive increase in an amount of retained austenite may arise. Therefore, manganese is preferably not higher than 1.25 mass %.

Nickel: not higher than 2.5 mass %

By adding nickel to steel forming the steel member, an effect of improvement in toughness is obtained. On the other hand, when nickel exceeds 2.5 mass %, such problems as acceleration of graphitization of carbide and lowering in hardness due to excessive increase in an amount of retained austenite may arise. Therefore, nickel is preferably not higher than 2.5 mass %.

Molybdenum: not higher than 10.0 mass %

By adding molybdenum to steel forming the steel member, such effects as increase in hardness at a high temperature, improvement in creep resistance, and improvement in wear resistance are obtained. On the other hand, when molybdenum exceeds 10.0 mass %, a problem of increase in manufacturing cost of a steel member with increase in price of a steel material may arise. Therefore, molybdenum is preferably not higher than 10.0 mass %.

Vanadium: not higher than 5.2 mass %

By adding vanadium to steel forming the steel member, such effects as increase in hardness at a high temperature and improvement in wear resistance are obtained. On the other hand, when vanadium exceeds 5.2 mass %, a problem of increase in manufacturing cost of a steel member with increase in price of a steel material may arise. Therefore, vanadium is preferably not higher than 5.2 mass %.

In the roller follower according to one aspect and another aspect above, preferably, the rolling contact surface of the steel member has hardness not lower than 58 HRC. Thus, wear resistance and durability against rolling contact fatigue of the steel member at the rolling contact surface are improved and durability of the roller follower is further improved.

In the roller follower according to one aspect and another aspect above, preferably, an area of the steel member extending from the rolling contact surface to a thickness not greater than 50 $\mu M$ has hardness not lower than 58 HRC.

In an example where a contact pressure applied to the rolling contact surface of the steel member is not higher than 2000 MPa, when the area extending to a thickness not greater than 50 $\mu m$ from the rolling contact surface that may be damaged due to wear has the hardness above, wear resistance of the area is improved and durability of the roller follower is further improved. If a contact pressure applied to the rolling contact surface of the steel member exceeds 2000 MPa, an area extending to a thickness not greater than 400 $\mu m$ from the rolling contact surface, which is an area that may be damaged due to rolling contact fatigue, preferably has hardness not lower than 58 HRC. Thus, not only wear resistance of the area but also durability against rolling contact fatigue are improved and durability of the roller follower is further improved.

In the roller follower according to one aspect and another aspect above, the shaft above may be the steel member and may have a hollow shape having a through hole in a direction of axis. Here, a thickness of the area extending from the rolling contact surface and having hardness not lower than 58 HRC is preferably not greater than ⅓ of a total thickness.

As the shaft above has a hollow shape, the roller follower can be lighter in weight. In addition, by setting a thickness of the area having hardness not lower than 58 HRC to the thickness above, compressive stress is readily allowed to remain in the rolling contact surface. Consequently, the compressive stress suppresses occurrence and development of a crack in the rolling contact surface and durability of the roller follower is further improved.

In the roller follower according to one aspect and another aspect above, the shaft above may be the steel member and may have a solid shape. Here, a thickness of the area extending from the rolling contact surface and having hardness not lower than 58 HRC is preferably not greater than ⅓ of a radius in a cross-section perpendicular to the rolling contact surface.

As the shaft above has a solid shape, rigidity of the roller follower can be improved. In addition, by setting a thickness of the area having hardness not lower than 58 HRC to the thickness above, compressive stress is readily allowed to remain in the rolling contact surface. Consequently, the compressive stress suppresses occurrence and development of a crack in the rolling contact surface and durability of the roller follower is further improved.

A roller follower according to yet another aspect of the present invention is a roller follower interposed between a rocker arm and a cam for opening and closing a valve of an engine and arranged in contact with the cam. This roller follower includes an outer ring having an annular shape and a shaft arranged such that a slide surface formed on its outer circumferential surface is opposed to a slide surface formed on an inner circumferential surface of the outer ring. At least any one of the outer ring and the shaft is a steel member made of steel containing carbon not lower than 0.7 mass % and not higher than 2.4 mass % and chromium not lower than 10.0 mass % and not higher than 20.0 mass %, with remainder iron and impurities. In addition, carbide containing at least any one of iron and chromium as well as carbon and having an area of 12.6 $\mu m^2$ or greater is generated at an area ratio of 5.0% or higher, at the slide surface of the steel member.

In addition, a roller follower according to a different aspect of the present invention is a roller follower interposed between a rocker arm and a cam for opening and closing a valve of an engine and arranged in contact with the cam. This roller follower includes an outer ring having an annular shape and a shaft arranged such that a slide surface formed on its outer circumferential surface is opposed to a slide surface formed on an inner circumferential surface of the outer ring. At least any one of the outer ring and the shaft is a steel member made of steel containing carbon not lower than 0.7 mass % and not higher than 2.4 mass % and chromium not lower than 10.0 mass % and not higher than 20.0 mass % as well as at least one element selected from the group consisting of silicon not higher than 3.5 mass %, manganese not higher than 1.25 mass %, nickel not higher than 2.5 mass %, molybdenum not higher than 10.0 mass %, and vanadium not higher than 5.2 mass %, with remainder iron and impurities. In addition, carbide containing at least any one of iron and chromium as well as carbon and having an area of 12.6 $\mu m^2$ or greater is generated at an area ratio of 5.0% or higher, at the slide surface of the steel member.

In the roller follower according to yet another aspect and the different aspect of the present invention, at least any one of the outer ring and the shaft constituting the roller follower is a steel member having an appropriate component composition as in the roller follower according to one aspect and another aspect of the present invention above, and the slide surface of the steel member has features the same as the rolling contact surface of the steel member according to one aspect and another aspect of the present invention above. Consequently, according to the roller follower in yet another aspect and the different aspect of the present invention, a roller follower in which damages due to wear caused by introduction of soot particles are suppressed and durability has sufficiently been improved, similar to the roller follower according to one aspect and another aspect of the present invention above, can be provided.

In the roller follower according to yet another aspect and the different aspect above, preferably, the slide surface of the steel member has hardness not lower than 58 HRC. Thus, wear resistance of the steel member at the slide surface is improved and durability of the roller follower is further improved.

In the roller follower according to yet another aspect and the different aspect above, preferably, an area of the steel member extending from the slide surface to a thickness not greater than 50 μm has hardness not lower than 58 HRC.

As the area extending to a thickness not greater than 50 μm from the slide surface that may be damaged due to wear has the hardness above, wear resistance of the area is improved and durability of the roller follower is further improved.

In the roller follower according to yet another aspect and the different aspect above, the shaft above may be the steel member and may have a hollow shape having a through hole in a direction of axis. Here, a thickness of the area extending from the slide surface and having hardness not lower than 58 HRC is preferably not greater than ⅓ of a total thickness.

As the shaft above has a hollow shape, the roller follower can be lighter in weight. In addition, by setting a thickness of the area having hardness not lower than 58 HRC to the thickness above, compressive stress is readily allowed to remain in the slide surface. Consequently, the compressive stress suppresses occurrence and development of a crack in the slide surface and durability of the roller follower is further improved.

In the roller follower according to yet another aspect and the different aspect above, the shaft above may be the steel member and may have a solid shape. Here, a thickness of the area extending from the slide surface and having hardness not lower than 58 HRC is preferably not greater than ⅓ of a radius in a cross-section perpendicular to the slide surface.

As the shaft above has a solid shape, rigidity of the roller follower can be improved. In addition, by setting a thickness of the area having hardness not lower than 58 HRC to the thickness above, compressive stress is readily allowed to remain in the slide surface. Consequently, the compressive stress suppresses occurrence and development of a crack in the slide surface and durability of the roller follower is further improved.

In the roller follower above, preferably, the engine is a diesel engine or a direct-injection gasoline engine.

In a diesel engine or a direct-injection gasoline engine, an amount of generation of soot is particularly great and hence an amount of soot particles introduced in the roller follower becomes great. Therefore, for a roller follower to be used in a diesel engine or a direct-injection gasoline engine, the roller follower according to the present invention above, in which damages due to wear caused by introduction of soot particles are suppressed and durability has sufficiently been improved, is suitable.

A valve train according to the present invention is a valve train for opening and closing a valve of an engine by operating a rocker arm. This valve train includes the roller follower according to the present invention above and a holding member for holding the roller follower. In addition, the roller follower is fixed to the holding member by a caulked portion formed as a result of plastic deformation of an end portion of the shaft.

In the valve train according to the present invention, the roller follower according to the present invention above having excellent durability is adopted as a roller follower and the shaft of the roller follower is fixed by caulking to the holding member, so that the roller follower can securely be fixed to the holding member while the number of parts is decreased. Consequently, according to the valve train of the present invention, a valve train having excellent durability while manufacturing cost is reduced can be provided.

In the valve train above, preferably, the caulked portion above has hardness not higher than 35 HRC.

As the caulked portion has hardness not higher than 35 HRC, the caulked portion can sufficiently deform during caulking and the shaft of the roller follower and the holding member can further securely be fixed to each other. If the caulked portion has hardness lower than 10 HRC, strength of the caulked portion may be insufficient. Therefore, the caulked portion preferably has hardness not lower than 10 HRC.

In the valve train above, preferably, the caulked portion above is formed across an area extending from the end portion of the shaft by 1 mm or greater in a direction of axis. Thus, the shaft of the roller follower and the holding member can further securely be fixed to each other.

An induction hardening apparatus according to the present invention is an induction hardening apparatus for a shaft member made of steel. The induction hardening apparatus includes a power supply portion, a coil connected to the power supply portion, and a holding member arranged on a side of an axial end portion of the coil. The holding member includes an end surface holding portion for holding an end surface of the shaft member and an outer circumferential surface holding portion projecting from the end surface holding portion toward the coil, for holding an outer circumferential surface of the shaft member.

As described above, in order to decrease the number of parts of the roller follower, the end portion of the shaft of the roller follower may be caulked. In such a case, an area of the outer circumferential surface of the shaft that comes in contact with a roller or a roller ring (an outer ring) (a shaft rolling contact surface or a shaft slide surface) should be quench-hardened so as to have high hardness for ensuring sufficient durability. Meanwhile, in quench-hardening of the shaft rolling contact surface or the shaft slide surface, when the end portion of the shaft member to be caulked is simultaneously quench-hardened, workability of the end portion lowers and caulking becomes difficult. In order to allow caulking, such a complicated process as subjecting only the end portion again to tempering treatment is required. Therefore, in order to avoid that, the end portion of the shaft member to be caulked is desirably not quench-hardened at the time of quench-hardening of the shaft rolling contact surface or the shaft slide surface.

The induction hardening apparatus according to the present invention includes the holding member arranged on the side of the axial end portion of the coil, and the holding member includes the end surface holding portion and the outer circumferential surface holding portion. Therefore, the shaft member can be arranged such that the outer circumferential surface of the shaft member to serve as the shaft of the roller follower is opposed to the inner circumferential surface of the coil and the end surface of the shaft member and the end portion area of the outer circumferential surface continuing to the end surface are in contact with the holding member. By feeding a high-frequency current to the coil in this state, induction heating of the area of the outer circumferential surface of the shaft member to serve as the shaft rolling contact surface or the shaft slide surface to a temperature not lower than an $A_1$ transformation point (an $A_{C1}$ transformation point) allowing quench-hardening is achieved while heat at the end surface of the shaft member and the end portion area of the outer circumferential surface continuing to the end surface flows to the holding member, whereby a temperature lower than a temperature allowing quenching can be achieved. Consequently, by rapidly cooling the shaft member after heating above, the area to serve as the shaft rolling contact surface or the shaft slide surface is quench-hardened and provided with sufficient durability, while the area at the end portion to be caulked is not quench-hardened but maintained at hardness allowing caulking. As described above, according to the induction hardening apparatus of the present invention, an induction hardening apparatus capable of manufacturing a shaft of a roller follower achieving sufficiently improved durability while ensuring sufficient workability of the end portion can be provided.

From a point of view of efficiently causing heat to flow from the end portion of the shaft member, the holding member is preferably made of a material high in thermal conductivity, and the holding member can be made, for example, of a non-magnetic metal material having a relatively high melting point such as SUS303 which is austenite-based stainless steel, a ceramic material good in thermal conduction and strong against thermal shock, and the like.

In the induction hardening apparatus above, preferably, the outer circumferential surface holding portion is structured to hold the outer circumferential surface of the shaft member so as to be in contact with the outer circumferential surface of the shaft member around the entire circumference. Thus, as heat can efficiently be radiated to the holding member from the entire circumference of the outer circumferential surface of the shaft member in contact with the holding member, the end portion of the shaft member can more reliably be maintained at hardness allowing caulking.

In the induction hardening apparatus above, preferably, the coil above has a hollow portion passing through the coil in the direction of axis. In addition, a larger-diameter portion, which is an area having a cross-sectional area perpendicular to the direction of axis greater than that at opposing axial ends, is formed in an area of the hollow portion distant from the opposing axial ends.

As described above, when induction heating is performed while the end portion of the shaft member and the holding member are in contact with each other, a phenomenon that a heating temperature of the area of the outer circumferential surface of the shaft member to be quench-hardened, close to the end portion, is relatively lower than in a central portion in the direction of axis (uneven heating) is more likely. In order to address this, by adopting the structure above, the shaft member is arranged such that the central portion in the direction of axis of the outer circumferential surface of the shaft member is opposed to the larger-diameter portion and then induction heating is performed. Then, a distance between the central portion in the direction of axis and the coil is greater than in the area close to the end portion, and hence occurrence of uneven heating above can be suppressed.

A method of heat treatment of a shaft member according to one aspect of the present invention includes the steps of preparing a shaft member and quench-hardening the shaft member. In the step of preparing the shaft member, the shaft member made of steel containing carbon not lower than 0.7 mass % and not higher than 2.4 mass % and chromium not lower than 10.0 mass % and not higher than 20.0 mass %, with remainder iron and impurities, is prepared. In the step of quench-hardening the shaft member, the shaft member is quench-hardened by subjecting the shaft member to induction heating by supplying an AC current from a power supply to a coil while holding the shaft member with a holding member such that an outer circumferential surface of the shaft member is opposed to an inner circumferential surface of the coil connected to the power supply, followed by cooling of the shaft member. In addition, in the step of quench-hardening the shaft member, an end surface of the shaft member and an outer circumferential surface end portion area, which is an area of the outer circumferential surface continuing to the end surface, are subjected to induction heating while they are in contact with the holding member.

In addition, a method of heat treatment of a shaft member according to another aspect of the present invention includes the steps of preparing a shaft member and quench-hardening the shaft member. In the step of preparing a shaft member, the shaft member made of steel containing carbon not lower than 0.7 mass % and not higher than 2.4 mass % and chromium not lower than 10.0 mass % and not higher than 20.0 mass % as well as at least one element selected from the group consisting of silicon not higher than 3.5 mass %, manganese not higher than 1.25 mass %, nickel not higher than 2.5 mass %, molybdenum not higher than 10.0 mass %, and vanadium not higher than 5.2 mass %, with remainder iron and impurities, is prepared. In the step of quench-hardening the shaft member, the shaft member is quench-hardened by subjecting the shaft member to induction heating by supplying an AC current from a power supply to a coil while holding the shaft member with a holding member such that an outer circumferential surface of the shaft member is opposed to an inner circumferential surface of the coil connected to the power supply, followed by cooling of the shaft member. In addition, in the step of quench-hardening the shaft member, an end surface of the shaft member and an outer circumferential surface end portion area, which is an area of the outer circumferential surface continuing to the end surface, are subjected to induction heating while they are in contact with the holding member.

As described above, in order to manufacture a shaft in which damages due to wear caused by introduction of soot particles are suppressed and durability has sufficiently been improved, a shaft member made of steel above having an appropriate component composition is prepared and then an area of the outer circumferential surface to serve as the rolling contact surface or the slide surface should sufficiently be quench-hardened. On the other hand, in an example where the end portion is caulked as described above, the end portion of the shaft member to be caulked is desirably not quench-hardened in quench-hardening of the shaft rolling contact surface or the shaft slide surface.

In the method of heat treatment of the shaft member according to one aspect and another aspect of the present invention, in the step of preparing a shaft member, the shaft member made of steel above having an appropriate component composition is prepared. Then, in the step of quench-hardening the shaft member, the end surface of the shaft member and the outer circumferential surface end portion area, which is the area of the outer circumferential surface continuing to the end surface, are subjected to induction heating while they are in contact with the holding member. Therefore, induction heating of the area of the outer circumferential surface of the shaft member to serve as the shaft rolling contact surface or the shaft slide surface to a temperature allowing quench-hardening is achieved while heat at the end surface of the shaft member and the end portion area of the outer circumferential surface continuing to the end surface flows to the holding member, whereby a temperature lower than a temperature allowing quenching is maintained. Consequently, by rapidly cooling the shaft member after heating above, the area to serve as the shaft rolling contact surface or the shaft slide surface is quench-hardened and provided with sufficient durability, while the area at the end portion to be caulked is not quench-hardened but maintained at hardness allowing caulking. As described above, according to the method of heat treatment of the shaft member of the present invention, the method of heat treatment of a shaft member capable of sufficiently improving hardness of the area of the outer circumferential surface to serve as the rolling contact surface or the slide surface while ensuring sufficient workability of the end portion can be provided.

In the method of heat treatment of a shaft member above, preferably, in the step of quench-hardening the shaft member, the outer circumferential surface end portion area is subjected to induction heating while it is in contact with the holding member around the entire circumference. Thus, since heat can efficiently be radiated to the holding member from the entire circumference of the outer circumferential surface of the shaft member in contact with the holding member, the end portion of the shaft member can more reliably be maintained at hardness allowing caulking.

In the method of heat treatment of a shaft member above, preferably, the coil above has a hollow portion passing through the coil in the direction of axis. A larger-diameter portion, which is an area having a cross-sectional area perpendicular to the direction of axis greater than that at opposing axial ends, is formed in an area of the hollow portion distant from the opposing axial ends. In addition, in the step of quench-hardening the shaft member, the area of the outer circumferential surface of the shaft member distant from the opposing axial ends is subjected to induction heating so as to be opposed to the larger-diameter portion while the shaft member is held with the holding member.

As described above, when induction heating is performed while the end portion of the shaft member and the holding member are in contact with each other, a phenomenon that a heating temperature of the area of the outer circumferential surface of the shaft member to be quench-hardened, close to the end portion, is relatively lower than in a central portion in the direction of axis (uneven heating) is more likely. In order to address this, by adopting the structure above, a distance between the central portion in the direction of axis and the coil is greater than in the area close to the end portion, and hence occurrence of uneven heating above can be suppressed.

In the method of heat treatment of a shaft member above, preferably, the step of quench-hardening the shaft member is performed repeatedly two or more times. Steel having a component composition adopted in the present invention may not sufficiently be hardened by performing quench-hardening only once. In order to address this, by performing the step of quench-hardening the shaft member repeatedly two or more times, sufficient quench-hardening of the area of the shaft member to serve as the rolling contact surface or the slide surface can more reliably be achieved.

A method of manufacturing a shaft according to the present invention includes the steps of preparing and quench-hardening a shaft member and fixing the shaft member to another member different from the shaft member by plastically working an axial end portion of the quench-hardened shaft member. The step of preparing and quench-hardening a shaft member is performed by using the method of heat treatment of a shaft member according to the present invention above.

By adopting the method of heat treatment of a shaft member according to the present invention capable of sufficiently improving hardness of the area of the outer circumferential surface to serve as the rolling contact surface or the slide surface while ensuring sufficient workability of the end portion, according to the method of manufacturing a shaft of the present invention, a shaft achieving sufficiently improved durability while ensuring sufficient workability of the end portion can be manufactured.

In the method of manufacturing a shaft according to the present invention above, preferably, in the step of preparing and quench-hardening a shaft member, the shaft member having a length in the direction of axis greater than a desired dimension in the direction of axis of the quench-hardened shaft member prior to plastic working in the step of fixing the shaft member is prepared.

According to the method of manufacturing a shaft in which the method of heat treatment of a shaft member according to the present invention above is adopted, the shaft member tends to contract in the direction of axis through quench-hardening. In order to address this, by adopting the feature above, a quench-hardened shaft member having a dimension closer to a desired dimension can be fabricated and the shaft member can be fixed to another member.

A shaft according to the present invention is manufactured with the method of manufacturing a shaft according to the present invention above. Thus, a shaft achieving sufficiently improved durability while ensuring sufficient workability of the end portion can be provided.

The shaft above may be used as a shaft of a roller follower interposed between a rocker arm and a cam for opening and closing a valve of an engine and arranged in contact with the cam. Thus, a shaft of a roller follower achieving sufficiently improved durability while ensuring sufficient workability of an end portion can be provided.

Effects of the Invention

As can clearly be understood from the description above, according to the roller follower and the valve train of the present invention, a roller follower achieving sufficiently improved durability and a valve train can be provided. In addition, according to the shaft as well as the induction hardening apparatus, the method of heat treatment of a shaft member, and the method of manufacturing a shaft of the present invention, a shaft that can be used as a shaft of a roller follower achieving sufficiently improved durability while ensuring sufficient workability of an end portion as well as the induction hardening apparatus capable of manufacturing a shaft, the method of heat treatment of a shaft member, and the method of manufacturing a shaft can be provided.

Figure 1:
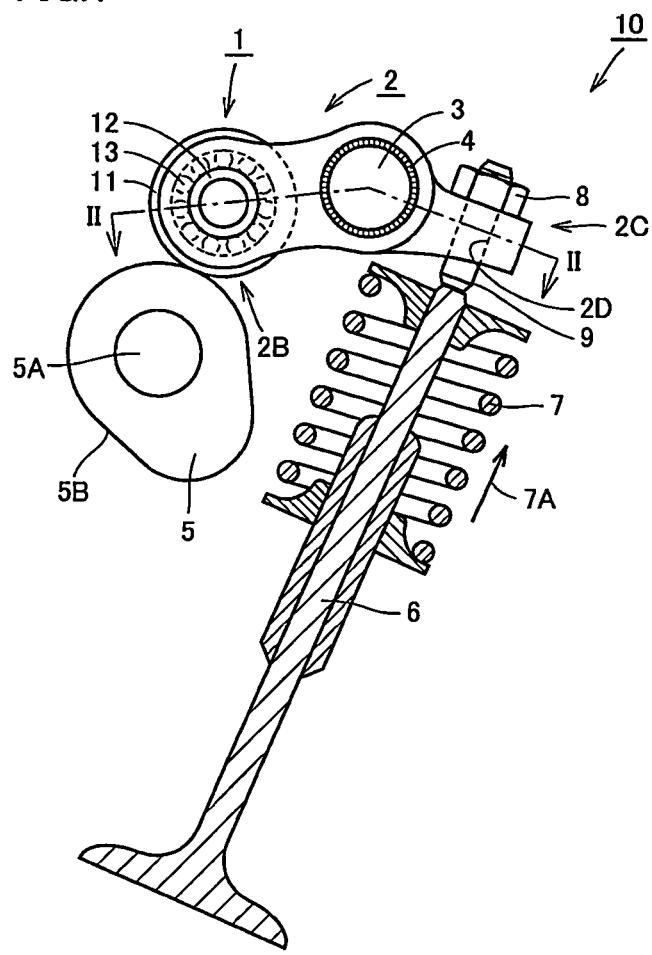
FIG. 1 is a schematic diagram showing a structure of a valve train including a roller follower in Embodiment 1.

DESCRIPTION OF THE REFERENCE SIGNS 1 roller follower; 2 rocker arm; 2B one end portion; 2C the other end portion; 2D through hole; 3 rocker arm shaft; 4 bearing metal; 5 cam; 5A camshaft; 5B outer circumferential surface; 6 valve; 7 spring; 8 locknut; 9 adjust screw; 10 valve train; 11 roller ring; 11A roller ring rolling contact surface; 11B roller ring rolling contact portion; 11G roller ring slide surface; 11H roller ring slide portion; 12 shaft; 12A shaft rolling contact surface; 12B shaft rolling contact portion; 12C low-hardness area; 12D end surface; 12E groove portion; 12F through hole; 12G shaft slide surface; 12H shaft slide portion; 13 roller; 13A roller rolling contact surface; 13B roller rolling contact portion; 15 fixing ring; 16 fixing pin; 21 sidewall; 21A through hole; 21B tapered portion; 21C projecting portion; 21D groove portion; 21E second through hole; 22 pivot abutment portion; 40 shell-type radial load test machine; 41 rotation shaft; 42 drive roller; 42A outer circumferential surface; 43 outer ring; 44 roller; 45 bearing; 46 load transmission member; 47 cartridge heater; 50 induction hardening apparatus; 51 power supply portion; 52 coil; 52A hollow portion; 52B larger-diameter portion; 53 holding member; 53A end surface holding portion; 53B outer circumferential surface holding portion; 60 shaft member; 61 end surface; 62 outer circumferential surface; 80 adjust screw; 81 coupling member; 82 locknut; and 90 pushrod.

BEST MODES FOR CARRYING OUT THE INVENTION

An embodiment of the present invention will be described hereinafter with reference to the drawings. In the drawings below, the same or corresponding elements have the same reference characters allotted and description thereof will not be repeated.

(Embodiment 1)

Initially, a valve train including a roller follower in Embodiment 1 will be described with reference to FIGS. 1 to 3.

Figure 2:
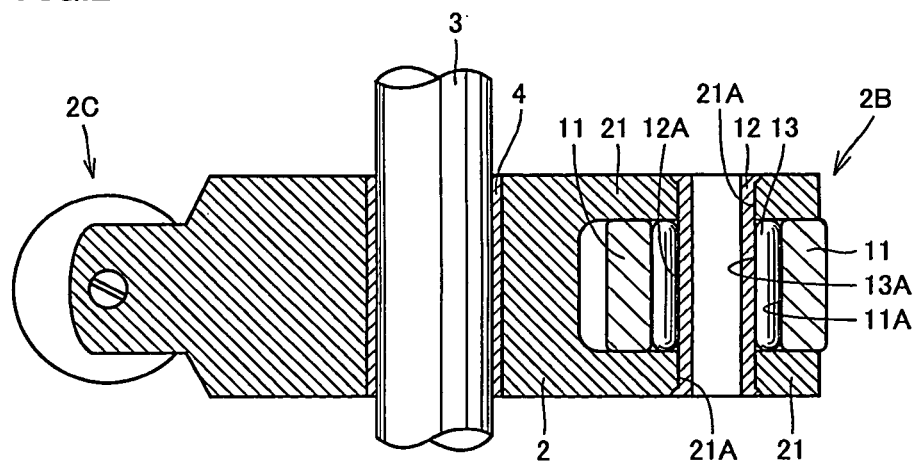
FIG. 2 is a schematic cross-sectional view along the line II-II in FIG. 1.

Referring to FIGS. 1 and 2, a valve train 10 includes a roller follower 1 which is a radial roller bearing of full-complement roller type, a rocker arm 2 serving as a holding member for holding roller follower 1 at one end portion 2B, a cam 5 arranged to be in contact, at its outer circumferential surface 5B, with an outer circumferential surface of a roller ring 11 serving as an outer ring of roller follower 1, an adjust screw 9 inserted in a through hole 2D formed in the other end portion 2C of rocker arm 2 and fixed to rocker arm 2 by means of a locknut 8, and a valve 6, which is an intake or exhaust valve of an engine, coupled at its one end portion to one end portion of adjust screw 9.

Referring to FIGS. 1 and 2, roller follower 1 includes annular roller ring 11 serving as the outer ring, a hollow cylindrical shaft 12 passing through roller ring 11, and a plurality of rollers 13 serving as rolling elements arranged between roller ring 11 and shaft 12. Rocker arm 2 is held by a rocker arm shaft 3 in a central portion with a bearing metal 4 or the like being interposed, and it is pivotable around rocker arm shaft 3. Valve 6 receives force in a direction shown with an arrow 7A, as a result of elastic force of a spring 7. Therefore, roller follower 1 is always pressed against outer circumferential surface 5B of cam 5 by elastic force of spring 7 via adjust screw 9 and rocker arm 2. Cam 5 has an egg-like cross-sectional shape in a cross-section perpendicular to a direction of axis of shaft 12, which is an inner ring of roller follower 1. Cam 5 is formed integrally with a camshaft 5A and structured to be rotatable around camshaft 5A.

Referring to FIG. 2, one end portion 2B side of rocker arm 2 has a bifurcated shape, with a pair of sidewalls 21 being formed. The pair of sidewalls 21 each has a coaxial, cylindrical through hole 21A formed. Shaft 12 of roller follower 1 is fitted to pass through both through holes 21A in the pair of sidewalls 21. A shaft rolling contact surface 12A is formed on the outer circumferential surface of shaft 12, and a plurality of rollers 13 are arranged to be in contact with shaft rolling contact surface 12A at a roller rolling contact surface 13A which is the outer circumferential surface.

In addition, roller ring 11 is arranged between the pair of sidewalls 21, and a roller ring rolling contact surface 11A is formed on an inner circumferential surface of roller ring 11 so as to be opposed to shaft rolling contact surface 12A. Rollers 13 are arranged such that roller rolling contact surfaces 13A thereof come in contact with roller ring rolling contact surface 11A. Roller ring 11 is thus held rotatable with respect to shaft 12.

Figure 3:
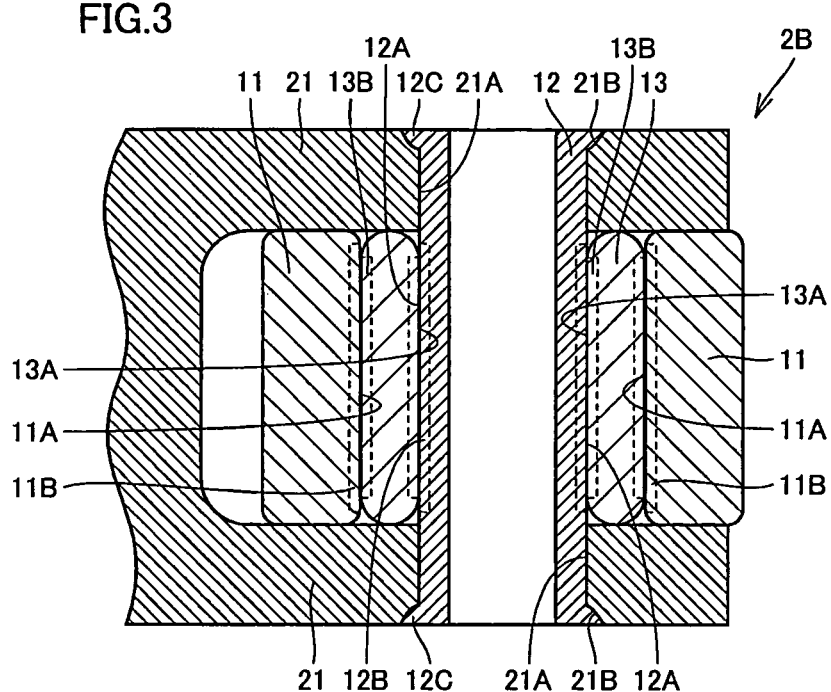
FIG. 3 is a schematic partial cross-sectional view, with a portion around the roller follower in FIG. 2 being enlarged.

Referring further to FIG. 3, a tapered portion 21B where a diameter in a cross-section perpendicular to the direction of axis of shaft 12 gradually increases is formed around an opening on an outer wall side of each of through holes 21A. Opposing end portions of shaft 12 are low-hardness areas 12C serving as caulked portions having hardness not higher than 35 HRC, and the end portions are subjected to caulking representing plastic working and deformed to extend along tapered portion 21B. In addition, low-hardness area 12C is formed across an area extending from the end portion of shaft 12 by 1 mm or greater in the direction of axis.

An operation of valve train 10 in Embodiment 1 will now be described. Referring to FIG. 1, when cam 5 rotates together with camshaft 5A with camshaft 5A serving as an axis, a distance from camshaft 5A to a portion of contact between cam 5 and roller follower 1 periodically changes. Therefore, rocker arm 2 swings, with rocker arm shaft 3 serving as a fulcrum. Consequently, valve 6 carries out reciprocating motion with adjust screw 9 being interposed. An intake valve or an exhaust valve of the engine thus opens and closes.

Here, referring to FIGS. 1 to 3, roller follower 1 in the present embodiment is a roller follower interposed between rocker arm 2 and cam 5 for opening and closing valve 6 of the engine and arranged in contact with cam 5. This roller follower 1 includes roller ring 11 serving as the outer ring having an annular shape, shaft 12 arranged such that shaft rolling contact surface 12A formed on the outer circumferential surface thereof is opposed to roller ring rolling contact surface 11A formed on the inner circumferential surface of roller ring 11, and rollers 13 serving as a plurality of rolling elements in contact, at roller rolling contact surface 13A formed on the outer circumferential surface thereof, with roller ring rolling contact surface 11A and shaft rolling contact surface 12A that are rolling contact surfaces of roller ring 11 and shaft 12 respectively, and arranged on an annular raceway.

At least shaft 12 among roller ring 11, shaft 12 and rollers 13, preferably all of roller ring 11, shaft 12 and rollers 13, is (are) steel member(s) made of steel containing carbon not lower than 0.7 mass % and not higher than 2.4 mass % and chromium not lower than 10.0 mass % and not higher than 20.0 mass %, with remainder iron and impurities, or steel containing carbon not lower than 0.7 mass % and not higher than 2.4 mass % and chromium not lower than 10.0 mass % and not higher than 20.0 mass % as well as at least one element selected from the group consisting of silicon not higher than 3.5 mass %, manganese not higher than 1.25 mass %, nickel not higher than 2.5 mass %, molybdenum not higher than 10.0 mass %, and vanadium not higher than 5.2 mass %, with remainder iron and impurities, such as SUS440C or SKD11 defined under JIS. In addition, carbide containing at least any one of iron and chromium as well as carbon and having an area of 12.6 $\mu m^2$ or greater is generated at an area ratio of 5.0% or higher, at the rolling contact surface of the steel member (roller ring rolling contact surface 11A, shaft rolling contact surface 12A and roller rolling contact surface 13A).

In addition, valve train 10 in the present embodiment is a valve train for opening and closing valve 6 of the engine by operating rocker arm 2. This valve train 10 includes roller follower 1 in the present embodiment and rocker arm 2 serving as the holding member for holding roller follower 1. Roller follower 1 is fixed to rocker arm 2 by low-hardness area 12C serving as the caulked portion formed as a result of plastic deformation of the end portion of shaft 12.

In roller follower 1 in the present embodiment, at least any one of roller ring 11, shaft 12 and rollers 13 constituting roller follower 1 is a steel member having the appropriate component composition above, and large-sized carbide having an area not smaller than 12.6 $\mu m^2$ is generated at the area ratio of 5.0% or higher at the rolling contact surface (roller ring rolling contact surface 11A, shaft rolling contact surface 12A and roller rolling contact surface 13A). Consequently, roller follower 1 in the present embodiment is a roller follower in which damages due to wear caused by introduction of soot particles are suppressed and durability has sufficiently been improved. In addition, in valve train 10 in the present embodiment, roller follower 1 having excellent durability is adopted as the roller follower and shaft 12 of roller follower 1 is fixed by caulking to rocker arm 2. Therefore, roller follower 1 is securely fixed to rocker arm 2 while the number of parts is decreased. Consequently, valve train 10 in the present embodiment is a valve train excellent in durability while achieving reduced manufacturing cost.

Moreover, in valve train 10 in the present embodiment, since low-hardness area 12C serving as the caulked portion and formed across an area extending from the end portion of shaft 12 by 1 mm or greater in the direction of axis has hardness not higher than 35 HRC, shaft 12 of roller follower 1 and rocker arm 2 are securely fixed to each other.

Here, in roller follower 1 in the present embodiment, preferably, at least any one of roller ring 11, shaft 12 and rollers 13 is a steel member and the rolling contact surface (roller ring rolling contact surface 11A, shaft rolling contact surface 12A and roller rolling contact surface 13A) of the steel member has hardness not lower than 58 HRC. Thus, wear resistance and durability against rolling contact fatigue of the steel member at the rolling contact surface (roller ring rolling contact surface 11A, shaft rolling contact surface 12A and roller rolling contact surface 13A) are improved and durability of roller follower 1 is further improved.

In addition, an area in at least any one of roller ring 11, shaft 12 and rollers 13, extending from the rolling contact surface (roller ring rolling contact surface 11A, shaft rolling contact surface 12A and roller rolling contact surface 13A) thereof to a thickness not greater than 50 µm (a roller ring rolling contact portion 11B, a shaft rolling contact portion 12B and a roller rolling contact portion 13B) preferably has hardness not lower than 58 HRC. Thus, wear resistance of the area is improved and durability of roller follower 1 is further improved.

Further, shaft 12 of roller follower 1 in the present embodiment is a steel member and in a hollow shape having a through hole in the direction of axis. Here, a thickness of the area extending from shaft rolling contact surface 12A, that has hardness not lower than 58 HRC, is preferably not great than ⅓ of a total thickness. Thus, compressive stress is readily allowed to remain in shaft rolling contact surface 12A, occurrence and development of a crack in shaft rolling contact surface 12A is suppressed, and durability of roller follower 1 is further improved.

Furthermore, the engine in which roller follower 1 and valve train 10 in the present embodiment are adopted is preferably a diesel engine or a direct-injection gasoline engine. Roller follower 1 and valve train 10 including the roller follower in the present embodiment, in which damages due to wear caused by introduction of soot particles are suppressed and durability has sufficiently been improved, are suitably adopted in a diesel engine or a direct-injection gasoline engine in which an amount of soot particles introduced into the roller follower tends to be great.

Figure 5:
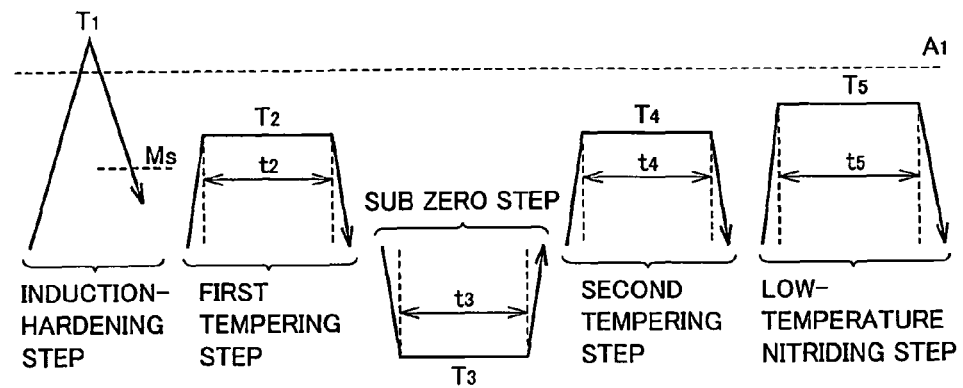
FIG. 5 is a diagram for illustrating details of a heat treatment process included in the method of manufacturing a shaft.
Figure 7:
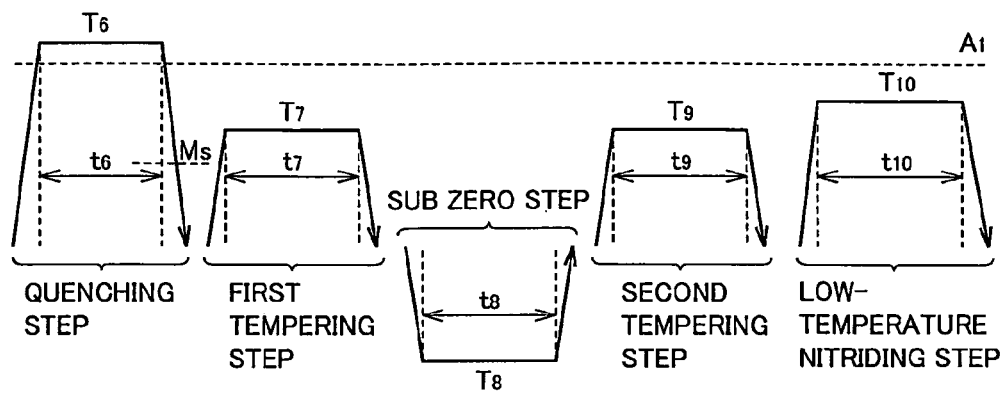
FIG. 7 is a diagram for illustrating details of a heat treatment process included in the method of manufacturing a roller ring and a roller.

A method of manufacturing roller follower 1 and valve train 10 in Embodiment 1 will now be described. In FIGS. 5 and 7, the horizontal direction represents time and lapse of time is indicated toward the right. In addition, in FIGS. 5 and 7, the vertical direction represents a temperature and a higher temperature is indicated toward the top.

Figure 4:
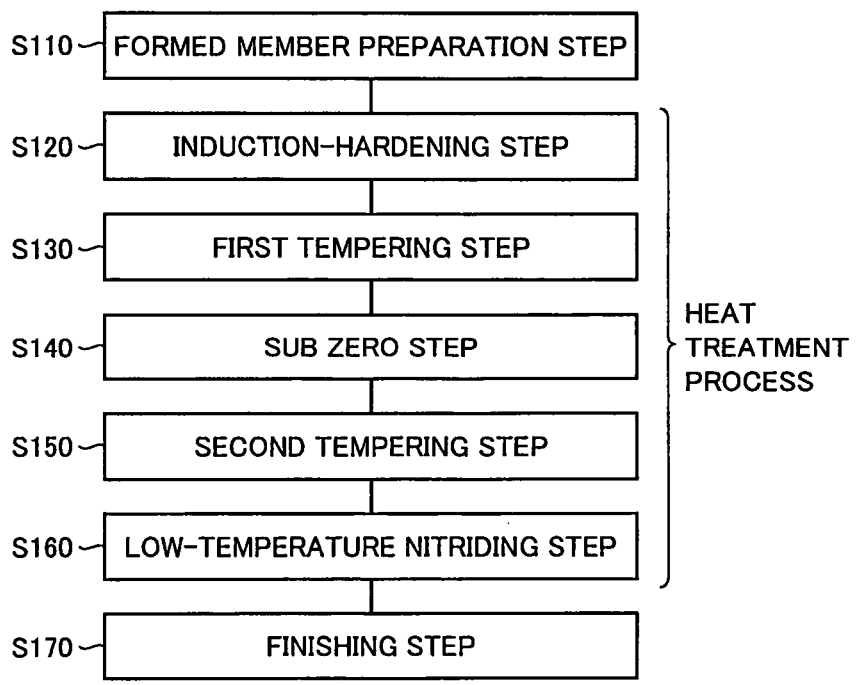
FIG. 4 is a flowchart showing outlines of a method of manufacturing a shaft, in a method of manufacturing a roller follower in Embodiment 1.

Initially, a method of manufacturing a shaft in the method of manufacturing a roller follower will be described. Referring to FIG. 4, in the method of manufacturing shaft 12 in the method of manufacturing roller follower 1 in Embodiment 1, initially, in a step (S110), a formed member preparation step is performed. Specifically, a steel material such as SUS440C or SKD11 defined under JIS is subjected to such working as forging or turning, to thereby prepare a formed member having a general shape of shaft 12.

Referring next to FIG. 4, in steps (S120) to (S160), an induction-hardening step, a first tempering step, a sub zero step, a second tempering step, and a low-temperature nitriding step constituting a heat treatment process are successively performed. Details of this heat treatment process will be described later.

Thereafter, a finishing step is performed in a step (S170). Specifically, finishing or the like of the rolling contact surface (shaft rolling contact surface 12A) of the formed member subjected to heat treatment in the heat treatment process above is performed. Thus, shaft 12 constituting roller follower 1 in Embodiment 1 is completed.

The heat treatment process included in the method of manufacturing shaft 12 in Embodiment 1 will now be described.

Referring to FIGS. 4 and 5, initially, in the induction-hardening step performed in the step (S120), a surface portion including the outer circumferential surface of the formed member prepared in the step (S110) is heated to a temperature $T_1$ which is a temperature not lower than the $A_1$ transformation point through induction heating using a high-frequency current, and thereafter it is cooled with water to a temperature not higher than an $M_S$ point. Thus, an area of the surface portion of the formed member, to serve as shaft rolling contact portion 12B (see FIG. 3), is quench-hardened (induction hardening). Here, a thickness of the quench-hardened surface portion, that is, a thickness of the surface portion heated to temperature $T_1$, which is the temperature not lower than the $A_1$ transformation point, through induction heating, is set to ⅓ or less of the total thickness of the formed member. Compressive stress is thus formed in the vicinity of the surface of the formed member. In addition, areas within at least 1 mm from opposing axial ends of the formed member are excluded from the area to be heated to temperature $T_1$, which is the temperature not lower than the $A_1$ transformation point, through induction heating. An area to serve as low-hardness area 12C, that is, the caulked portion (see FIG. 3), is thus secured. Further, temperature $T_1$ can be set to 1050° C. or higher and 1200° C. or lower, for example, when steel forming the formed member is SUS440C or SKD11 defined under JIS.

Here, the $A_1$ point refers to a point corresponding to a temperature at which steel structure starts to transform from ferrite to austenite as the steel is heated. Meanwhile, the $M_S$ point refers to a point corresponding to a temperature at which steel that turned into austenite starts to turn into martensite as the steel is cooled.

Thereafter, in the step (S130), the first tempering step, in which the formed member subjected to quenching treatment is subjected to tempering treatment, is performed. Specifically, the formed member is subjected to tempering treatment in such a manner that it is heated, for example, to a temperature $T_2$, which is a temperature lower than the $A_1$ transformation point, in atmosphere (in air) and held for a time period $t_2$ followed by cooling. Here, temperature $T_2$ can be set to 150° C. or higher and 200° C. or lower, for example, when steel forming the formed member is SUS440C or SKD11 defined under JIS, and time period $t_2$ can be set to 60 minutes or longer and 180 minutes or shorter. Thus, such an effect as suppression of strain of the formed member is obtained.

Thereafter, in the step (S140), the sub zero step, in which the formed member subjected to the first tempering step is subjected to sub zero treatment, is performed. Specifically, the formed member is cooled to a temperature $T_3$, which is a temperature lower than 0° C., for example as a result of being sprayed with liquid nitrogen, and held for a time period $t_3$. Here, temperature $T_3$ can be set to −200° C. or higher and −30° C. or lower, for example, when steel forming the formed member is SUS440C or SKD11 defined under JIS, and time $t_3$ can be set to 60 minutes or longer and 180 minutes or shorter. Thus, retained austenite generated in the quenching treatment of the formed member transforms into martensite, the steel structure is stabilized, and such an effect as increase in hardness is obtained.

Thereafter, in the step (S150), the second tempering step, in which the formed member subjected to the sub zero step is subjected to tempering treatment, is performed. Specifically, the formed member is subjected to the tempering treatment in such a manner that the formed member is heated, for example, to a temperature $T_4$ which is a temperature lower than the $A_1$ transformation point in atmosphere (in air) and held for a time period $t_4$ followed by cooling. Here, temperature $T_4$ can be set to 150° C. or higher and 200° C. or lower, for example, when steel forming the formed member is SUS440C or SKD11 defined under JIS, and time period $t_4$ can be set to 60 minutes or longer and 180 minutes or shorter. Thus, such an effect as suppression of strain of the formed member is obtained.

Then, in the step (S160), the low-temperature nitriding step, in which the formed member subjected to the second tempering step is subjected to low-temperature nitriding treatment, is performed. Specifically, the formed member is heated to a temperature $T_5$ which is a temperature not higher than 550° C., and a surface area including the outer circumferential surface is subjected to nitriding treatment for a time period $t_5$ through ion nitriding, gas nitriding, salt bath nitriding, or the like. Thus, hardness of the area of the formed member, to serve as shaft rolling contact surface 12A (see FIG. 3), further increases. Through the procedure above, the heat treatment process included in the method of manufacturing shaft 12 in Embodiment 1 is completed.

Figure 6:
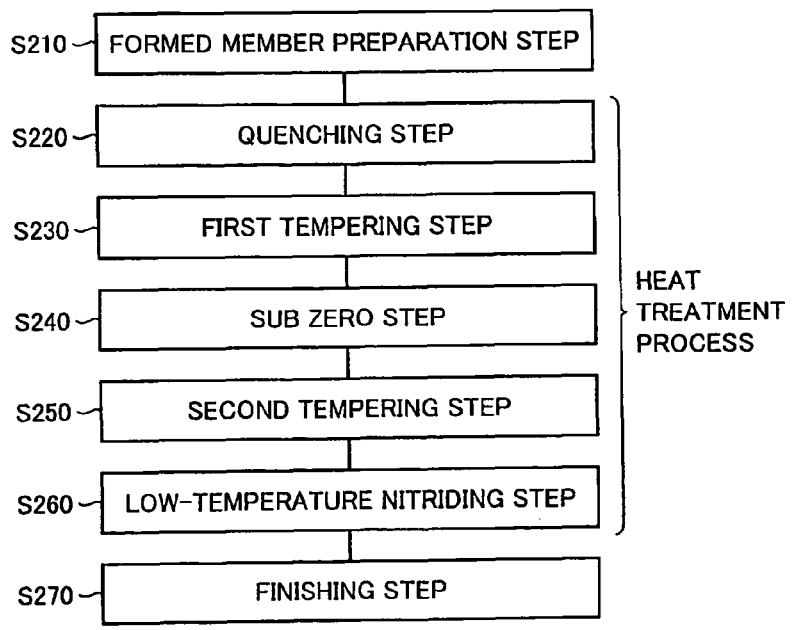
FIG. 6 is a flowchart showing outlines of a method of manufacturing a roller ring and a roller, in the method of manufacturing a roller follower in Embodiment 1.

The method of manufacturing a roller ring and a roller in the method of manufacturing a roller follower will now be described. Referring to FIGS. 6 and 7, the method of manufacturing a roller ring and a roller can be performed basically similarly to the method of manufacturing a shaft described above with reference to FIGS. 4 and 5, and a formed member preparation step, a quenching step, a first tempering step, a sub zero step, a second tempering step, a low-temperature nitriding step, and a finishing step (steps (S210) to (S270)) in the method of manufacturing a roller ring and a roller correspond to the steps (S110) to (S170) in the step of manufacturing a shaft, respectively. The method of manufacturing a roller ring and a roller, however, is different from the method of manufacturing a shaft in that, in the quenching step (the step (S220)) in the heat treatment process, the entire formed member is quench-hardened, instead of only the surface portion of the formed member being quench-hardened.

Namely, referring to FIGS. 6 and 7, in the quenching step (the step (S220)) in the heat treatment process included in the method of manufacturing a roller ring and a roller, the quenching step, in which the entire formed member made of steel such as SUS440C or SKD11 defined under JIS prepared in the step (S210) is quench-hardened, is performed. Specifically, the formed member is placed, for example, in a vacuum furnace, heated to a temperature $T_6$ which is a temperature not lower than the $A_1$ transformation point in a pressure-reduced atmosphere (under vacuum), and held for a time period $t_6$, followed by cooling to a temperature not higher than the $M_S$ point. Here, temperature $T_6$ can be set to 1000° C. or higher and 1100° C. or lower, for example, when steel forming the formed member is SUS440C or SKD11 defined under JIS, and time period $t_6$ can be set to 15 minutes or longer and 60 minutes or shorter. Thus, the entire formed member including the area to serve as roller ring rolling contact portion 11B and roller rolling contact portion 13B of the formed member (see FIG. 3) is quench-hardened. Here, heating in an atmospheric furnace (including a vacuum furnace) of which atmosphere is controllable as described above or heating using an induction heating furnace may be adopted for heating the formed member.

Thereafter, in the heat treatment process of the roller ring and the roller, the steps (S230) to (260) are performed similarly to the steps (S130) to (S160) in the heat treatment process of the shaft. Here, conditions similar to temperatures $T_2$ to $T_5$ and time periods $t_2$ to $t_5$ in the heat treatment process of the shaft can be adopted for temperatures $T_7$ to $T_{10}$ and time periods $t_7$ to $t_{10}$, respectively. Then, in the step (S270), the finishing step, in which finishing or the like of the rolling contact surface (roller ring rolling contact surface 11A and roller rolling contact surface 13A) of the formed member subjected to heat treatment in the heat treatment process is performed, is performed. Thus, roller ring 11 and rollers 13 constituting roller follower 1 in Embodiment 1 are completed.

Figure 8:
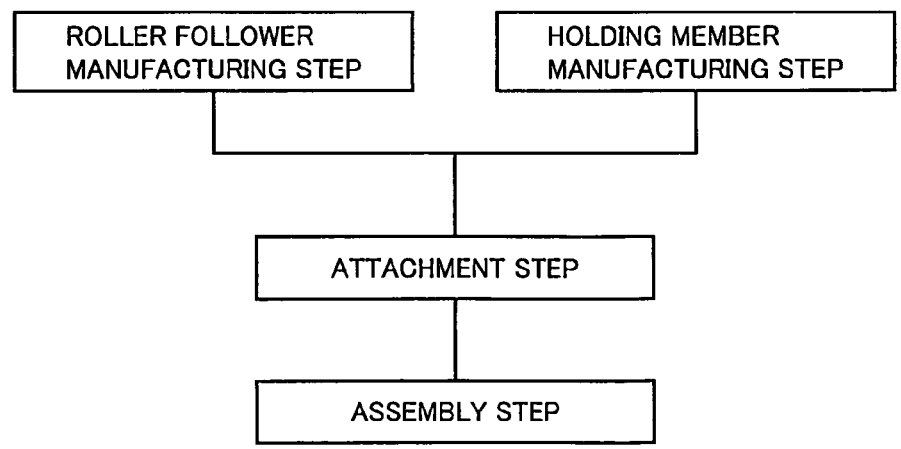
FIG. 8 is a diagram showing outlines of a method of manufacturing a valve train 10 in Embodiment 1.

A method of manufacturing valve train 10 in Embodiment 1 will now be described. Referring to FIG. 8, the method of manufacturing valve train 10 includes a roller follower manufacturing step of manufacturing roller follower 1, a holding member manufacturing step of manufacturing rocker arm 2 serving as the holding member, an attachment step for attaching roller follower 1 to rocker arm 2 serving as the holding member, and an assembly step of assembling valve train 10 by combining rocker arm 2 to which the roller follower has been attached with separately prepared cam 5, valve 6, spring 7, and the like.

Here, in the roller follower manufacturing step, roller ring 11, shaft 12 and rollers 13 are manufactured according to the method of manufacturing a roller follower described with reference to FIGS. 4 to 7.

In addition, in the attachment step, referring to FIG. 3, low-hardness areas 12C, which are the opposing end portions of shaft 12, are subjected to plastic working so that shaft 12 is fixed to rocker arm 2 manufactured in the holding member manufacturing step and roller follower 1 is attached to rocker arm 2. More specifically, roller ring 11 and a plurality of rollers 13 arranged to be in contact with roller ring rolling contact surface 11A of roller ring 11 are inserted between the pair of sidewalls 21 formed on one end portion 2B side of rocker arm 2. Thereafter, shaft 12 is inserted such that it simultaneously passes through through holes 21A formed in the pair of sidewalls 21 and shaft rolling contact surface 12A is in contact with the plurality of rollers 13. Then, low-hardness areas 12C, that are the opposing end portions of shaft 12, are subjected to caulking representing plastic working, so that shaft 12 is fixed to rocker arm 2 and roller follower 1 is attached to rocker arm 2.

In the assembly step, rocker arm 2 to which roller follower 1 has been attached is combined with separately prepared cam 5, valve 6, spring 7, and the like, to thereby complete valve train 10.

In Embodiment 1 above, an example where the sub zero step and the low-temperature nitriding step are performed in the heat treatment process in the method of manufacturing roller ring 11, shaft 12 and rollers 13 has been described. If sufficient characteristics are obtained without these steps in consideration of an environment or the like where the roller follower is used, these steps may be omitted for the purpose of reduction in manufacturing cost. Here, if the sub zero step is omitted, the second tempering step can also be omitted. In addition, in Embodiment 1 above, a case where a procedure including the steps (S120) to (S160) is adopted in the heat treatment process in the method of manufacturing shaft 12 has been described. Instead, however, a procedure similar to the steps (S220) to (S260) may be adopted and further an end portion softening step for softening the opposing end portions of shaft 12 may be performed. The end portion softening step can be performed, for example, by heating the opposing end portions of shaft 12 (the formed member) subjected to the step (S260) to a temperature not higher than the $A_1$ transformation point through induction heating.

(Embodiment 2)

Embodiment 2 representing one embodiment of the present invention will now be described. Referring to FIGS. 1 to 3 and 9, valve train 10 and roller follower 1 in Embodiment 2 are basically structured and operate similarly to valve train 10 and roller follower 1 in Embodiment 1 and achieve similar effects. On the other hand, valve train 10 and roller follower 1 in Embodiment 2 are different from those in Embodiment 1 in a structure of an area where shaft 12 of roller follower 1 and rocker arm 2 are fixed to each other.

Figure 9:
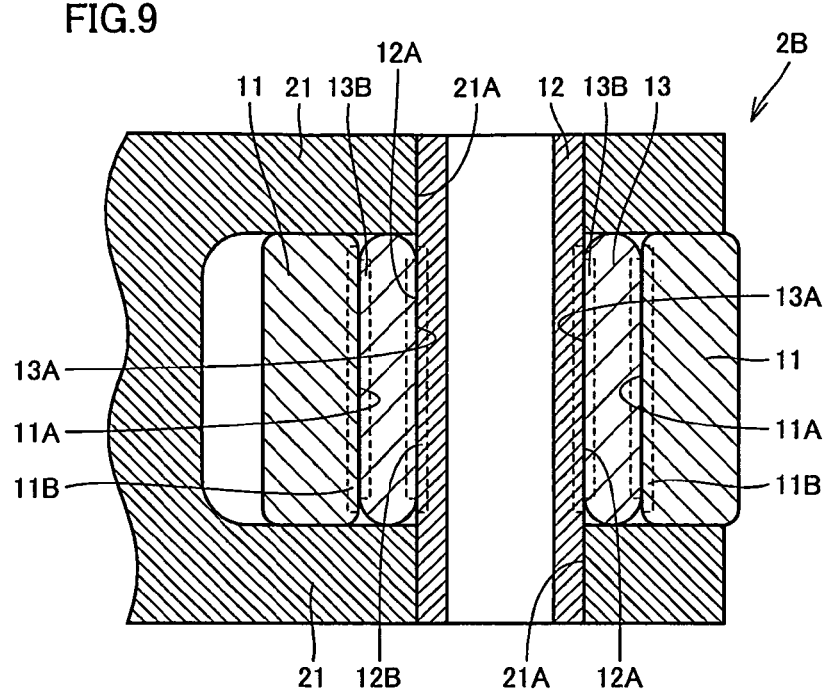
FIG. 9 is a schematic partial cross-sectional view, with a portion around a roller follower of a valve train in Embodiment 2 being enlarged.

Namely, referring to FIG. 9, unlike Embodiment 1, tapered portion 21B is not formed in through hole 21A formed in the pair of sidewalls 21 of the rocker arm, and a diameter in a cross-section perpendicular to the direction of axis of shaft 12 is constant. In addition, unlike Embodiment 1, the opposing end portions of shaft 12 do not have low-hardness area 12C but shaft 12 as a whole has uniform hardness.

Valve train 10 and roller follower 1 in Embodiment 2 can basically be manufactured as in Embodiment 1. The method of manufacturing valve train 10 and roller follower 1 in Embodiment 2 is different from that in Embodiment 1 in the heat treatment process in the method of manufacturing shaft 12 and the attachment step in the method of manufacturing a valve train.

Namely, referring to FIGS. 4 to 7, the heat treatment process in the method of manufacturing shaft 12 in Embodiment 2 can be performed in accordance with a procedure similar to the steps (S220) to (S260), instead of the steps (S120) to (S160) in Embodiment 1. Namely, in Embodiment 2, since it is not necessary to form low-hardness areas 12C at opposing end portions of shaft 12, shaft 12 can be fabricated by performing the heat treatment process in the procedure similar to the steps (S220) to (S260).

Moreover, in the attachment step in the method of manufacturing a valve train, as in Embodiment 1, initially, roller ring 11 and a plurality of rollers 13 arranged to be in contact with roller ring rolling contact surface 11A of roller ring 11 are inserted between the pair of sidewalls 21 formed on one end portion 2B side of rocker arm 2. Thereafter, shaft 12 is press-fitted such that it simultaneously passes through through holes 21A formed in the pair of sidewalls 21 and shaft rolling contact surface 12A comes in contact with the plurality of rollers 13. Here, as shaft 12 is press-fitted into through holes 21A, shaft 12 is fixed to rocker arm 2. Therefore, unlike Embodiment 1, the step of caulking opposing ends of shaft 12 can be omitted.

(Embodiment 3)

Embodiment 3 representing one embodiment of the present invention will now be described. Referring to FIGS. 1 to 3 and 10, valve train 10 and roller follower 1 in Embodiment 3 are basically structured and operate similarly to valve train 10 and roller follower 1 in Embodiment 1 and achieve similar effects. On the other hand, valve train 10 and roller follower 1 in Embodiment 3 are different from those in Embodiment 1 in a structure of an area where shaft 12 of roller follower 1 and rocker arm 2 are fixed to each other.

Figure 10:
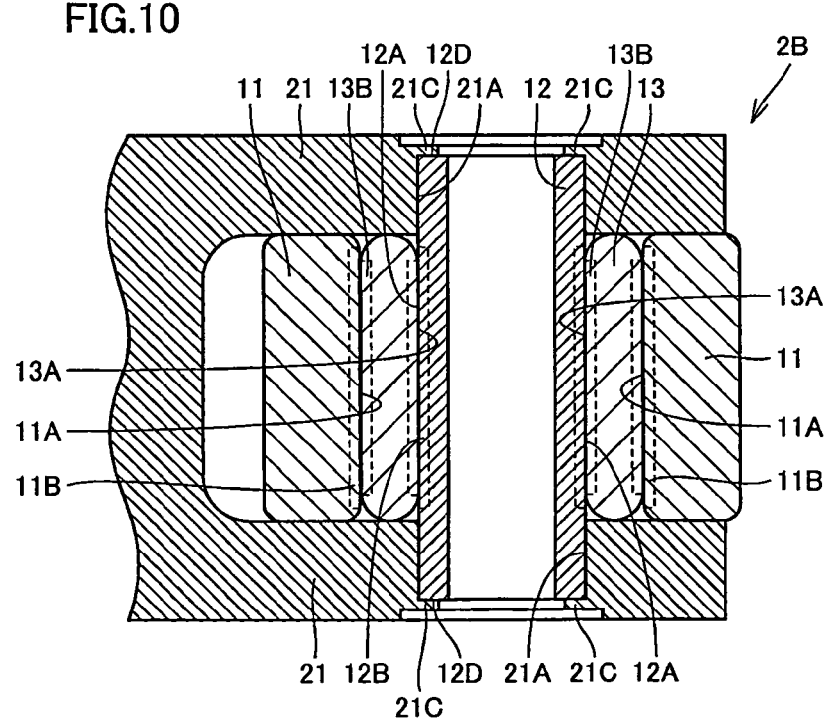
FIG. 10 is a schematic partial cross-sectional view, with a portion around a roller follower of a valve train in Embodiment 3 being enlarged.

Namely, referring to FIG. 10, unlike Embodiment 1, tapered portion 21B is not formed in through hole 21A formed in the pair of sidewalls 21 of rocker arm 2, and instead, a projecting portion 21C projecting toward the center in a radial direction of through hole 21A is formed. In addition, as an end surface 12D of shaft 12 and projecting portion 21C above come in contact with each other, shaft 12 is fixed to rocker arm 2.

Valve train 10 and roller follower 1 in Embodiment 3 can basically be manufactured as in Embodiment 1. The method of manufacturing valve train 10 and roller follower 1 in Embodiment 3 is different from that in Embodiment 1 in the heat treatment process in the method of manufacturing shaft 12 and the attachment step in the method of manufacturing a valve train.

Namely, referring to FIGS. 4 to 7, the heat treatment process in the method of manufacturing shaft 12 in Embodiment 3 can be performed in accordance with a procedure similar to the steps (S220) to (S260), instead of the steps (S120) to (S160) in Embodiment 1. Namely, in Embodiment 3, since it is not necessary to form low-hardness areas 12C at opposing end portions of shaft 12, shaft 12 can be fabricated by performing the heat treatment process in the procedure similar to the steps (S220) to (S260).

Moreover, in the attachment step in the method of manufacturing a valve train, as in Embodiment 1, initially, roller ring 11 and a plurality of rollers 13 arranged to be in contact with roller ring rolling contact surface 11A of roller ring 11 are inserted between the pair of sidewalls 21 formed on one end portion 2B side of rocker arm 2. Thereafter, shaft 12 is inserted such that it simultaneously passes through through holes 21A formed in the pair of sidewalls 21 and shaft rolling contact surface 12A comes in contact with the plurality of rollers 13. Then, an end portion on an outer side of through hole 21A (when viewed from one sidewall 21, an opening portion of through hole 21A opposite to the other sidewall 21) is plastically deformed such that a cross-sectional area of through hole 21A is smaller, to thereby form projecting portion 21C. By bringing projecting portion 21C and end surface 12D of shaft 12 in contact with each other, shaft 12 is fixed to rocker arm 2.

(Embodiment 4)

Embodiment 4 representing one embodiment of the present invention will now be described. Referring to FIGS. 1 to 3 and 11 and 12, valve train 10 and roller follower 1 in Embodiment 4 are basically structured and operate similarly to valve train 10 and roller follower 1 in Embodiment 1 and achieve similar effects. On the other hand, valve train 10 and roller follower 1 in Embodiment 4 are different from those in Embodiment 1 in a structure of an area where shaft 12 of roller follower 1 and rocker arm 2 are fixed to each other.

Figure 11:
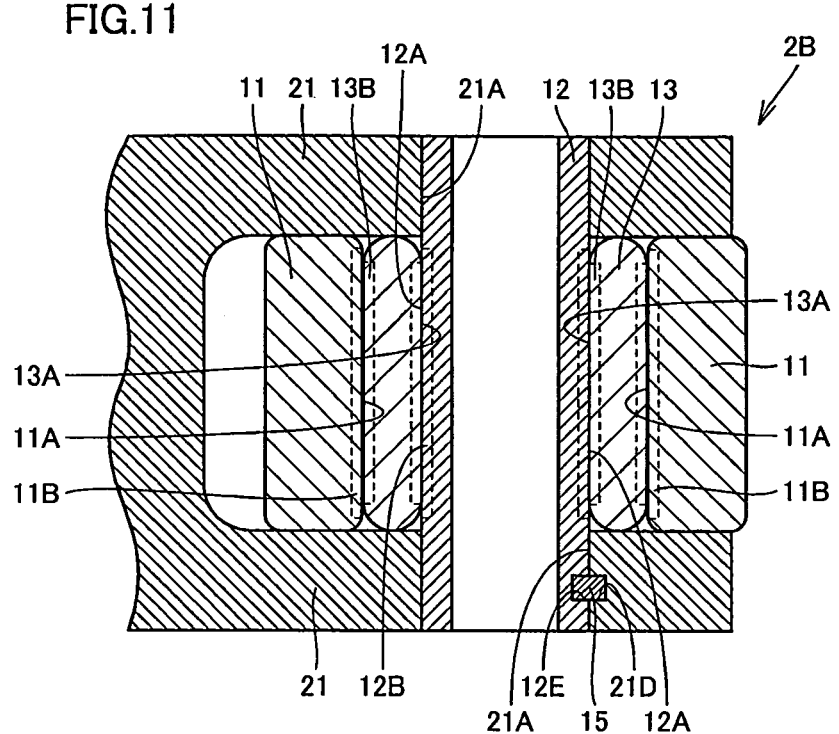
FIG. 11 is a schematic partial cross-sectional view, with a portion around a roller follower of a valve train in Embodiment 4 being enlarged.
Figure 12:
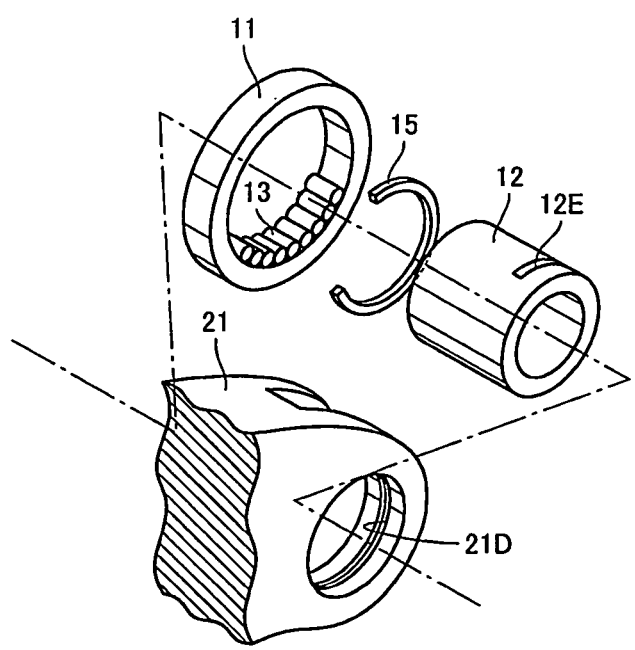
FIG. 12 is a schematic perspective view, with a portion around a roller follower of a valve train being enlarged.

Namely, referring to FIGS. 11 and 12, unlike Embodiment 1, tapered portion 21B is not formed in through hole 21A formed in the pair of sidewalls 21 of rocker arm 2, and instead, a groove portion 21D, which is an area having a larger cross-sectional area in the cross-section perpendicular to the direction of axis of through hole 21A, is formed in through hole 21A formed in one sidewall 21. Groove portion 21D extends along a circumferential direction in the inner circumferential surface of through hole 21A formed in one sidewall 21. In addition, groove portion 21D in the cross-section perpendicular to the direction of axis of through hole 21A has a C-shape. Moreover, a C-shaped groove portion 12E extending along a circumferential direction is also formed in the outer circumferential surface of shaft 12, in correspondence with groove portion 21D above. Then, rocker arm 2 and shaft 12 are arranged such that groove portion 21D of through hole 21A and groove portion 12E of shaft 12 are opposed to each other, and a fixing ring 15 having a C-shape corresponding to groove portion 21D of through hole 21A and groove portion 12E of shaft 12 is arranged to fit in both of groove portion 21D of through hole 21A and groove portion 12E of shaft 12. Thus, shaft 12 is fixed to rocker arm 2.

Valve train 10 and roller follower 1 in Embodiment 4 can basically be manufactured as in Embodiment 1. The method of manufacturing valve train 10 and roller follower 1 in Embodiment 4 is different from that in Embodiment 1 in the heat treatment process in the method of manufacturing shaft 12 and the attachment step in the method of manufacturing a valve train.

Namely, referring to FIGS. 4 to 7, the heat treatment process in the method of manufacturing shaft 12 in Embodiment 4 can be performed in accordance with a procedure similar to the steps (S220) to (S260), instead of the steps (S120) to (S160) in Embodiment 1. Namely, in Embodiment 4, since it is not necessary to form low-hardness areas 12C at opposing end portions of shaft 12, shaft 12 can be fabricated by performing the heat treatment process in the procedure similar to the steps (S220) to (S260).

Moreover, in the attachment step in the method of manufacturing a valve train, as in Embodiment 1, initially, roller ring 11 and a plurality of rollers 13 arranged to be in contact with roller ring rolling contact surface 11A of roller ring 11 are inserted between the pair of sidewalls 21 formed on one end portion 2B side of rocker arm 2. Thereafter, fixing ring 15 prepared separately is fitted into groove portion 12E of shaft 12.

Here, an inner diameter of fixing ring 15 is set to be slightly greater than a diameter of a circle along a bottom wall of groove portion 12E. Then, by applying external force, fixing ring 15 is elastically deformed along the bottom wall of groove portion 12E. Thereafter, shaft 12 is inserted such that it simultaneously passes through through holes 21A formed in the pair of sidewalls 21 and shaft rolling contact surface 12A comes in contact with the plurality of rollers 13. Then, when groove portion 12E of shaft 12 reaches a portion opposed to groove portion 21D of through hole 21A, fixing ring 15 returns to a shape close to its original shape as a result of elastic force and it is fitted into both of groove portion 21D of through hole 21A and groove portion 12E of shaft 12. Thus, shaft 12 is fixed to rocker arm 2.

(Embodiment 5)

Embodiment 5 representing one embodiment of the present invention will now be described. Referring to FIGS. 1 to 3 and 13, valve train 10 and roller follower 1 in Embodiment 5 are basically structured and operate similarly to valve train 10 and roller follower 1 in Embodiment 1 and achieve similar effects. On the other hand, valve train 10 and roller follower 1 in Embodiment 5 are different from those in Embodiment 1 in a structure of an area where shaft 12 of roller follower 1 and rocker arm 2 are fixed to each other.

Figure 13:
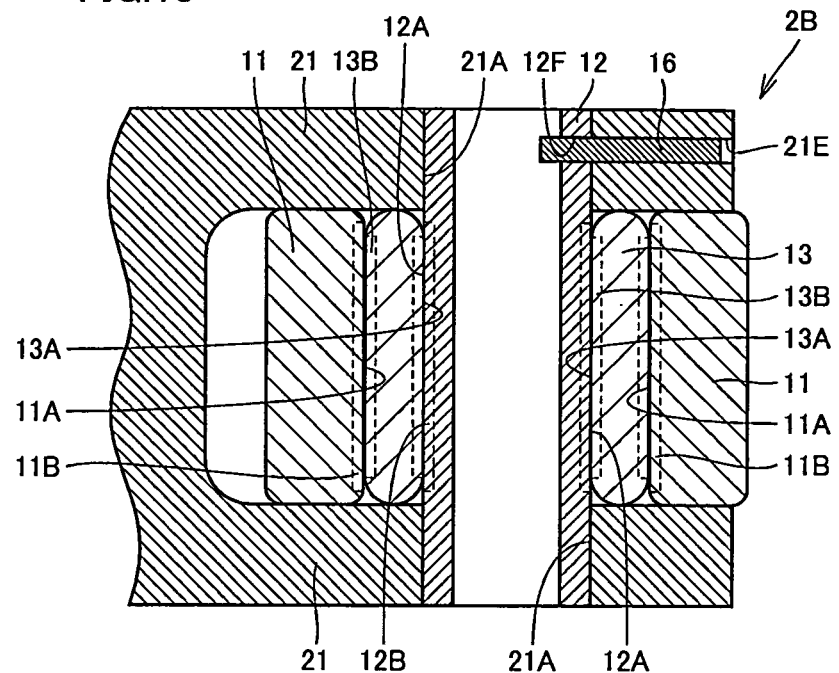
FIG. 13 is a schematic partial cross-sectional view, with a portion around a roller follower of a valve train in Embodiment 5 being enlarged.

Namely, referring to FIG. 13, unlike Embodiment 1, tapered portion 21B is not formed in through hole 21A formed in the pair of sidewalls 21 of rocker arm 2, and instead, a cylindrical second through hole 21E connecting through hole 21A formed in one sidewall 21 and an end surface on one end portion 2B side of rocker arm 2 to each other is formed. In addition, a cylindrical second through hole 12F passing through a sidewall of shaft 12 is formed also in shaft 12, in correspondence with second through hole 21E above.

Then, rocker arm 2 and shaft 12 are arranged such that a central axis of second through hole 21E in sidewall 21 and a central axis of second through hole 12F in shaft 12 correspond to each other. In addition, a cylindrical fixing pin 16 having an outer diameter in conformity with an inner diameter of second through hole 21E in sidewall 21 and second through hole 12F in shaft 12 is inserted to extend from second through hole 21E in sidewall 21 to second through hole 12F in shaft 12. Thus, shaft 12 is fixed to rocker arm 2.

Valve train 10 and roller follower 1 in Embodiment 5 can basically be manufactured as in Embodiment 1. The method of manufacturing valve train 10 and roller follower 1 in Embodiment 5 is different from that in Embodiment 1 in the heat treatment process in the method of manufacturing shaft 12 and the attachment step in the method of manufacturing a valve train.

Namely, referring to FIGS. 4 to 7, the heat treatment process in the method of manufacturing shaft 12 in Embodiment 5 can be performed in accordance with a procedure similar to the steps (S220) to (S260), instead of the steps (S120) to (S160) in Embodiment 1. Namely, in Embodiment 5, since it is not necessary to form low-hardness areas 12C at opposing end portions of shaft 12, shaft 12 can be fabricated by performing the heat treatment process in the procedure similar to the steps (S220) to (S260).

Moreover, in the attachment step in the method of manufacturing a valve train, as in Embodiment 1, initially, roller ring 11 and a plurality of rollers 13 arranged to be in contact with roller ring rolling contact surface 11A of roller ring 11 are inserted between the pair of sidewalls 21 formed on one end portion 2B side of rocker arm 2. Thereafter, shaft 12 is inserted such that it simultaneously passes through through holes 21A formed in the pair of sidewalls 21 and shaft rolling contact surface 12A comes in contact with the plurality of rollers 13. Then, fixing pin 16 is inserted to extend from second through hole 21E in sidewall 21 to second through hole 12F in shaft 12. Thus, shaft 12 is fixed to rocker arm 2.

(Embodiment 6)

Embodiment 6 representing one embodiment of the present invention will now be described. Referring to FIGS. 1 to 3 and 14, valve train 10 and roller follower 1 in Embodiment 6 are basically structured and operate similarly to valve train 10 and roller follower 1 in Embodiment 1 and achieve similar effects. On the other hand, valve train 10 and roller follower 1 in Embodiment 6 are different from those in Embodiment 1 in a structure of shaft 12 of roller follower 1.

Figure 14:
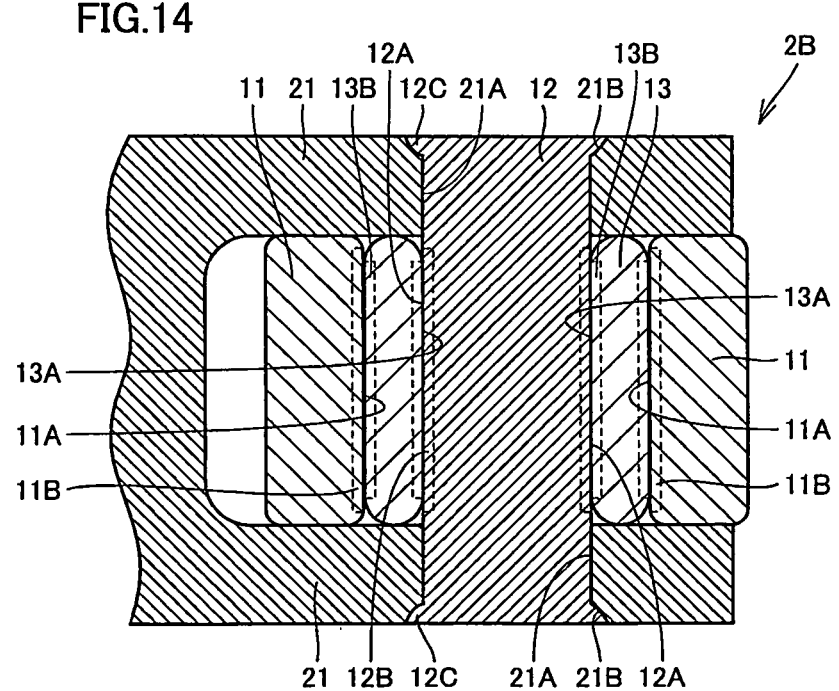
FIG. 14 is a schematic partial cross-sectional view, with a portion around a roller follower of a valve train in Embodiment 6 being enlarged.

Namely, referring to FIG. 14, unlike Embodiment 1, shaft 12 of roller follower 1 has a solid shape. In addition, a thickness of the area extending from shaft rolling contact surface 12A and having hardness not lower than 58 HRC is preferably not greater than ⅓ of a radius in the cross-section perpendicular to shaft rolling contact surface 12A. Thus, compressive stress is readily allowed to remain in shaft rolling contact surface 12A, occurrence and development of a crack in shaft rolling contact surface 12A is suppressed, and durability of roller follower 1 is further improved. It is noted that valve train 10 and roller follower 1 in Embodiment 6 can be manufactured as in Embodiment 1.

(Embodiment 7)

Embodiment 7 representing one embodiment of the present invention will now be described. Referring to FIGS. 1 to 3 and 15, valve train 10 and roller follower 1 in Embodiment 7 are basically structured and operate similarly to valve train 10 and roller follower 1 in Embodiment 1 and achieve similar effects. On the other hand, valve train 10 and roller follower 1 in Embodiment 7 are different from those in Embodiment 1 in a structure of roller follower 1.

Figure 15:
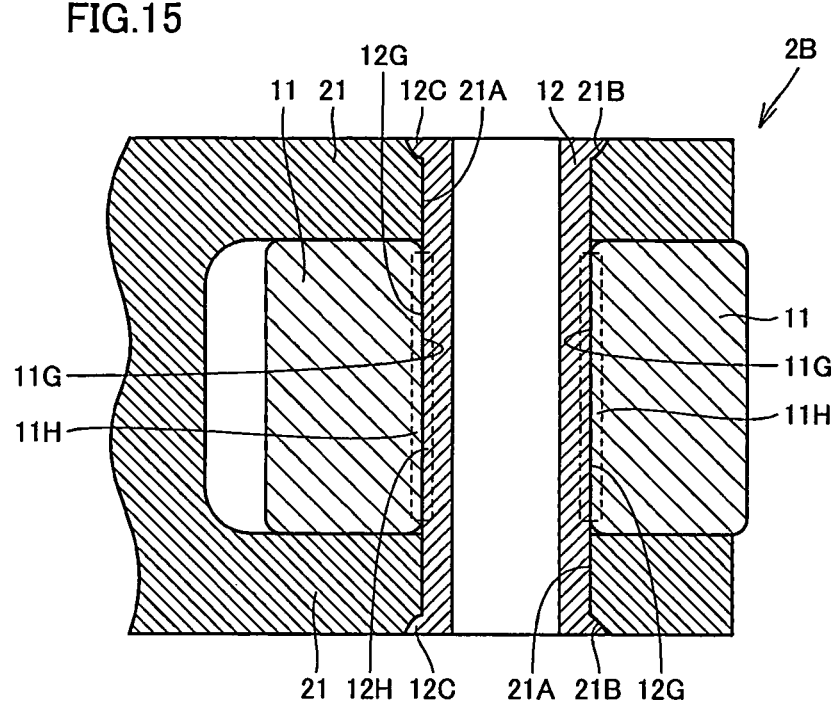
FIG. 15 is a schematic partial cross-sectional view, with a portion around a roller follower of a valve train in Embodiment 7 being enlarged.
Figure 16:
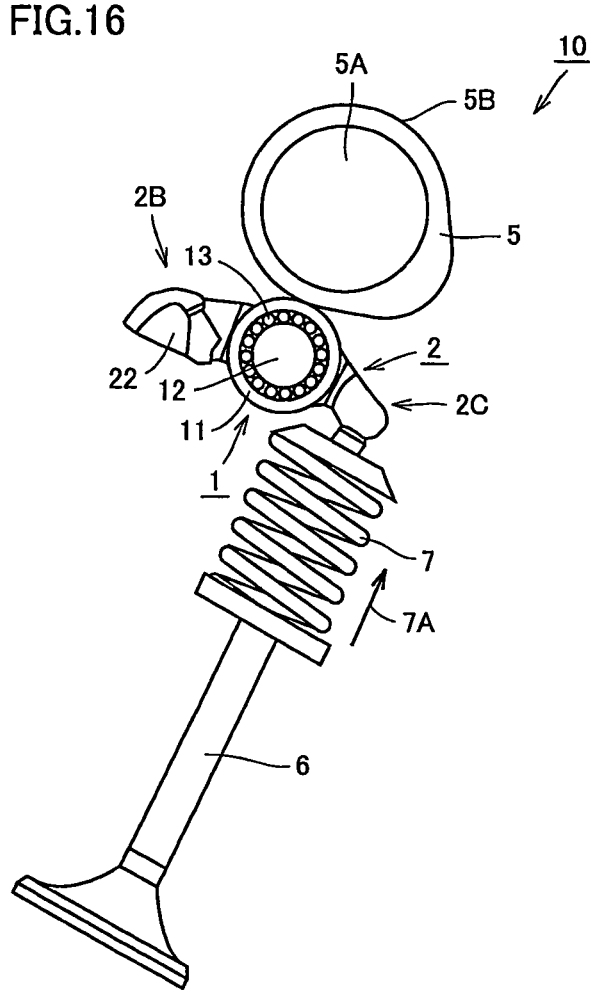
FIG. 16 is a schematic diagram showing a structure of a valve train including a roller follower in Embodiment 8.
Figure 17:
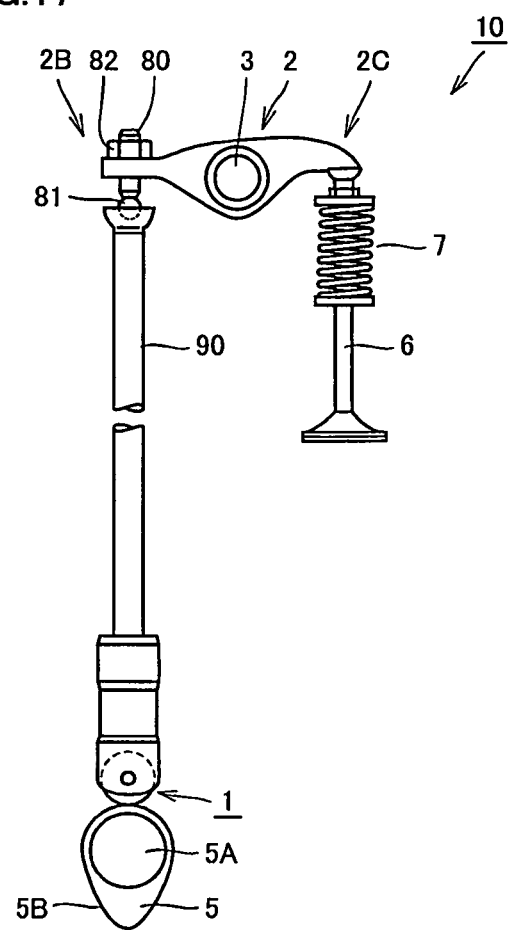
FIG. 17 is a schematic diagram showing a structure of a valve train including a roller follower in Embodiment 9.
Figure 18:
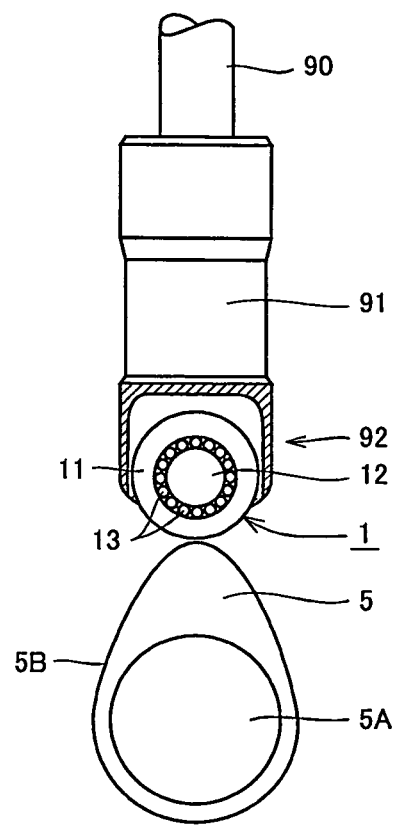
FIG. 18 is a schematic diagram, with a portion around a roller follower in FIG. 17 being enlarged.

Referring to FIG. 15, unlike Embodiment 1, roller follower 1 has no roller 13. Namely, roller follower 1 in Embodiment 7 is a plain bearing.

More specifically, roller follower 1 in Embodiment 7 includes annular roller ring 11 serving as the outer ring and hollow cylindrical shaft 12 passing through roller ring 11. A shaft slide surface 12G is formed on an outer circumferential surface of shaft 12, and a roller ring slide surface 11G is formed on an inner circumferential surface of roller ring 11 to be opposed to (to be in contact with) shaft slide surface 12G. Thus, roller ring 11 is held rotatable with respect to shaft 12.

Here, referring to FIG. 15, roller follower 1 in the present embodiment includes roller ring 11 serving as the outer ring having an annular shape and shaft 12 arranged such that shaft slide surface 12G formed on the outer circumferential surface thereof is opposed to roller ring slide surface 11G formed on the inner circumferential surface of roller ring 11.

Then, at least any one of roller ring 11 and shaft 12, preferably both of roller ring 11 and shaft 12, is (are) steel member(s) made of steel containing carbon not lower than 0.7 mass % and not higher than 2.4 mass % and chromium not lower than 10.0 mass % and not higher than 20.0 mass %, with remainder iron and impurities, or steel containing carbon not lower than 0.7 mass % and not higher than 2.4 mass % and chromium not lower than 10.0 mass % and not higher than 20.0 mass % as well as at least one element selected from the group consisting of silicon not higher than 3.5 mass %, manganese not higher than 1.25 mass %, nickel not higher than 2.5 mass %, molybdenum not higher than 10.0 mass %, and vanadium not higher than 5.2 mass %, with remainder iron and impurities, such as SUS440C or SKD11 defined under JIS. In addition, carbide containing at least any one of iron and chromium as well as carbon and having an area of 12.6 $\mu m^2$ or greater is generated at an area ratio of 5.0% or higher, at the slide surface of the steel member (roller ring slide surface 11G and shaft slide surface 12G).

In roller follower 1 in the present embodiment, at least any one of roller ring 11 and shaft 12 constituting roller follower 1 is a steel member having the appropriate component composition above, and large-sized carbide having an area not smaller than 12.6 $\mu m^2$ is generated at the area ratio of 5.0% or higher at the slide surface (roller ring slide surface 11G and shaft slide surface 12G). Consequently, roller follower 1 in the present embodiment is a roller follower in which damages due to wear caused by introduction of soot particles are suppressed and durability has sufficiently been improved.

Here, in roller follower 1 in the present embodiment, preferably, at least any one of roller ring 11 and shaft 12 is a steel member and the slide surface (roller ring slide surface 11G and shaft slide surface 12G) of the steel member has hardness not lower than 58 HRC. Thus, wear resistance of the steel member at the slide surface (roller ring slide surface 11G and shaft slide surface 12G) is improved and durability of roller follower 1 is further improved.

In addition, an area in at least any one of roller ring 11 and shaft 12 that are steel members, extending from the slide surface (roller ring slide surface 11G and shaft slide surface 12G) to a thickness not greater than 50 μm (a roller ring slide portion 11H and a shaft slide portion 12H) preferably has hardness not lower than 58 HRC. Thus, wear resistance of the area is improved and durability of roller follower 1 is further improved.

Further, shaft 12 of roller follower 1 in the present embodiment is a steel member and in a hollow shape having a through hole in the direction of axis. Here, a thickness of the area extending from shaft slide surface 12G and having hardness not lower than 58 HRC is preferably not greater than ⅓ of a total thickness. Thus, compressive stress is readily allowed to remain in shaft slide surface 12G, occurrence and development of a crack in shaft slide surface 12G is suppressed, and durability of roller follower 1 is further improved.

In Embodiment 7 above, an example where shaft 12 is hollow has been described. As in Embodiment 6, however, shaft 12 may be solid. Here, a thickness of the area extending from shaft slide surface 12G and having hardness not lower than 58 HRC is preferably not greater than ⅓ of a radius in a cross-section perpendicular to shaft slide surface 12G. Thus, compressive stress is readily allowed to remain in shaft slide surface 12G, occurrence and development of a crack in shaft slide surface 12G is suppressed, and durability of roller follower 1 is further improved.

In addition, valve train 10 and roller follower 1 in Embodiment 7 can be manufactured as in Embodiment 1, except that fabrication of rollers 13 and incorporation of rollers 13 in roller follower 1 are omitted.

(Embodiment 8)

Embodiment 8 representing one embodiment of the present invention will now be described. Referring to FIGS. 1 to 3 and 16, valve train 10 in Embodiment 8 is basically structured similarly to valve train 10 in Embodiment 1 described above. On the other hand, valve train 10 in Embodiment 8 is different from valve train 10 in Embodiment 1 in that rocker arm 2 pivots around one end portion 2B of rocker arm 2.

Namely, in valve train 10 in Embodiment 8, a pivot abutment portion 22, to which a not-shown pivot abuts, is formed on one end portion 2B side of rocker arm 2. Then, rocker arm 2 is pivotably held, with pivot abutment portion 22 serving as a fulcrum.

An operation of valve train 10 in Embodiment 8 will now be described. When cam 5 rotates together with camshaft 5A with camshaft 5A serving as an axis, a distance from camshaft 5A to a portion of contact between cam 5 and roller follower 1 periodically changes. Therefore, rocker arm 2 swings, with pivot abutment portion 22 serving as a fulcrum. Consequently, valve 6 carries out reciprocating motion and an intake valve or an exhaust valve of the engine opens and closes.

It is noted that roller follower 1 and valve train 10 in Embodiment 8 are basically structured similarly to roller follower 1 and valve train 10 in Embodiment 1 as described above and can be manufactured with the similar manufacturing method.

(Embodiment 9)

Embodiment 9 representing one embodiment of the present invention will now be described. Referring to FIGS. 1 to 3 and 17 and 18, valve train 10 in Embodiment 9 is basically structured similarly to valve train 10 in Embodiment 1 described above. On the other hand, valve train 10 in Embodiment 9 is different from valve train 10 in Embodiment 1 in that a pushrod 90 is interposed between rocker arm 2 and roller follower 1 and roller follower 1 is attached to pushrod 90, instead of roller follower 1 being directly attached to rocker arm 2.

Namely, bar-shaped pushrod 90 is coupled to one end portion 2B of rocker arm 2, with an adjust screw 80 and a coupling member 81 fixed to rocker arm 2 by a locknut 82 being interposed. Roller follower 1 is attached to an end portion of pushrod 90 serving as the holding member, opposite to the side of coupling with rocker arm 2. Then, cam 5 is arranged to be in contact, at outer circumferential surface 5B thereof, with the outer circumferential surface of roller ring 11 of roller follower 1.

An operation of valve train 10 in Embodiment 9 will now be described. When cam 5 rotates together with camshaft 5A with camshaft 5A serving as an axis, a distance from camshaft 5A to a portion of contact between cam 5 and roller follower 1 periodically changes. Therefore, as one end portion 2B of rocker arm 2 is pressed by pushrod 90, rocker arm 2 swings with rocker arm shaft 3 serving as a fulcrum. Consequently, valve 6 carries out reciprocating motion and an intake valve or an exhaust valve of the engine opens and closes.

It is noted that roller follower 1 and valve train 10 in Embodiment 9 are basically structured similarly to shaft 12 and valve train 10 in Embodiment 1 as described above and can be manufactured with the similar manufacturing method.

In Embodiments 1 to 9 above, representative embodiments of the roller follower and the valve train according to the present invention have been exemplified, however, the roller follower and the valve train according to the present invention are not limited thereto and they may be implemented in various manners, including combination of the embodiments above.

(Embodiment 10)

Figure 19:
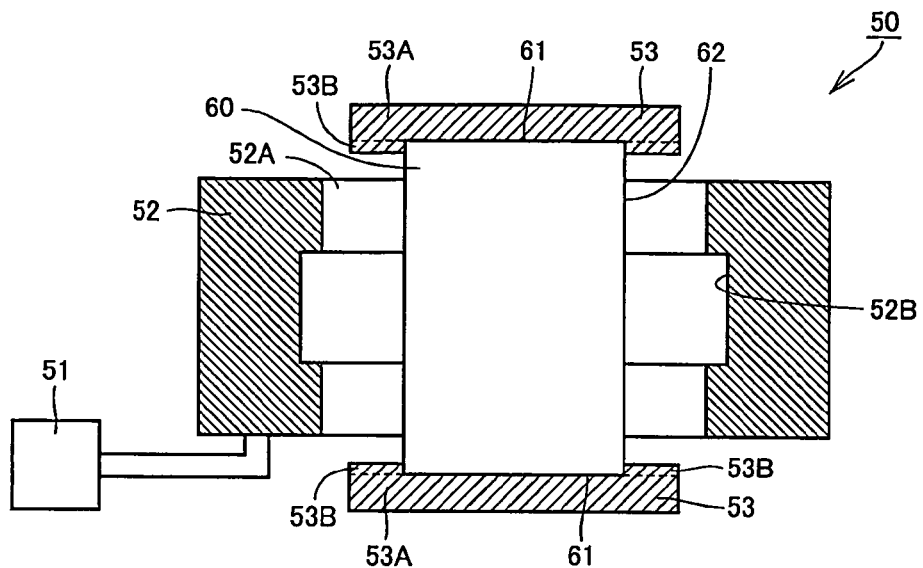
FIG. 19 is a schematic cross-sectional view showing a structure of an induction hardening apparatus in Embodiment 10.

Embodiment 10 representing one embodiment of the present invention will now be described. Referring to FIG. 19, an induction hardening apparatus 50 in Embodiment 10 includes a power supply portion 51, a coil 52 connected to power supply portion 51, and a pair of holding members 53 arranged on opposing sides, on axial end portion sides of coil 52. Power supply portion 51 can supply a high-frequency current to coil 52. Coil 52 has an annular shape as it has a cylindrical hollow portion 52A penetrating in the direction of axis. In addition, in hollow portion 52A of coil 52, a larger-diameter portion 52B, which is an area having a cross-sectional area perpendicular to the direction of axis larger than that at opposing axial ends, is formed in an area distant from the opposing axial ends.

Holding member 53 includes a disc-shaped end surface holding portion 53A and an outer circumferential surface holding portion 53B formed along an outer circumferential surface of end surface holding portion 53A and projecting from end surface holding portion 53A toward coil 52. This outer circumferential surface holding portion 53B has a hollow cylindrical shape having an outer circumferential surface along the outer circumferential surface of disc-shaped end surface holding portion 53A. Thus, holding member 53 has a disc shape and has a hollow cylindrical recess formed on one main surface side. The pair of holding members 53 is arranged to be opposed to each other, with a hollow portion of coil 52 lying therebetween. Thus, while a shaft member 60 in a cylindrical shape as an object to be treated is arranged such that an outer circumferential surface 62 thereof is opposed to an inner circumferential surface of coil 52, holding members 53 can hold shaft member 60 by fitting opposing end portions of the shaft member into the cylindrical recesses above.

Here, by shaping the cylindrical recess in holding member 53 in conformity with the end portion of shaft member 60 to be held, holding member 53 can come in contact with the entire end surface 61 of shaft member 60 at end surface holding portion 53A and come in contact with an area of outer circumferential surface 62 continuing to end surface 61 over the entire circumference.

Figure 20:
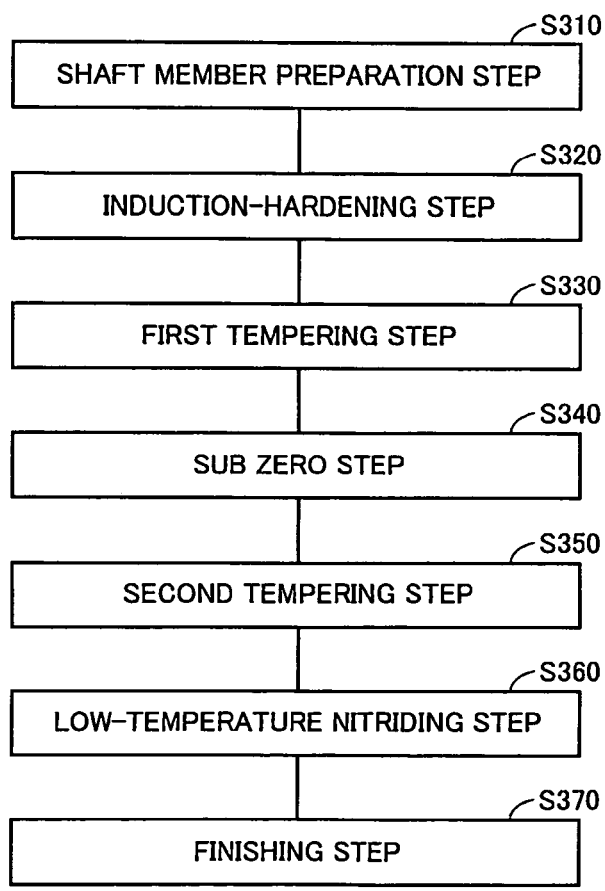
FIG. 20 is a flowchart for illustrating a method of manufacturing a shaft of a roller follower in Embodiment 10.

Referring next to FIGS. 19 and 20, a method of manufacturing a shaft of a cam follower in Embodiment 10 will be described. Referring to FIG. 20, in the method of manufacturing a shaft of a cam follower in Embodiment 10, initially, in a step (S310), a shaft member preparation step is performed. In this step (S310), referring to FIG. 19, a steel material made of steel containing carbon not lower than 0.7 mass % and not higher than 2.4 mass % and chromium not lower than 10.0 mass % and not higher than 20.0 mass %, with remainder iron and impurities, or steel containing carbon not lower than 0.7 mass % and not higher than 2.4 mass % and chromium not lower than 10.0 mass % and not higher than 20.0 mass % as well as at least one element selected from the group consisting of silicon not higher than 3.5 mass %, manganese not higher than 1.25 mass %, nickel not higher than 2.5 mass %, molybdenum not higher than 10.0 mass %, and vanadium not higher than 5.2 mass %, with remainder iron and impurities, such as SUS440C or SKD11 defined under JIS, is subjected to such working as forging and turning, to thereby prepare shaft member 60 having a hollow cylindrical or solid cylindrical shape.

Thereafter, in a step (S320), an induction-hardening step is performed. In this step (S320), initially, holding members 53 hold shaft member 60 such that the outer circumferential surface of shaft member 60 is opposed to the inner circumferential surface of coil 52 connected to power supply portion 51. Then, while this state is maintained, an AC current is supplied from power supply portion 51 to coil 52 for induction heating of shaft member 60. In addition, by cooling shaft member 60, shaft member 60 is quench-hardened. Here, in induction heating of shaft member 60, end surface holding portion 53A of holding member 53 comes in contact with the entire end surface 61 of shaft member 60 and outer circumferential surface holding portion 53B of holding member 53 comes in contact with outer circumferential surface 62 located at the end portion of shaft member 60 over the entire circumference. Thus, induction heating of the area of outer circumferential surface 62 of shaft member 60 to serve as the rolling contact surface or the slide surface to a temperature not lower than the $A_1$ transformation point (the $A_{C1}$ transformation point) is achieved while heat at end surface 61 of shaft member 60 and the end portion area of outer circumferential surface 62 continuing to end surface 61 flows to holding member 53, whereby a temperature lower than a temperature allowing quenching is maintained. Consequently, by rapidly cooling shaft member 60 after heating above, the area to serve as the rolling contact surface or the slide surface is quench-hardened and provided with sufficient durability, while the area at the end portion to be caulked is not quench-hardened but maintained at hardness allowing caulking.

Referring next to FIG. 20, in steps (S330), (S340), (S350), (S360), and (S370), a first tempering step, a sub zero step, a second tempering step, a low-temperature nitriding step, and a finishing step are performed, respectively. These steps (S330) to (S370) can be performed similarly to the steps (S130) to (S170) in Embodiment 1 above. Shaft member 60 on which the steps above were performed is attached to another member, for example, by caulking the end portion thereof in accordance with a procedure similar to attachment to rocker arm 2 in the method of manufacturing valve train 10 in Embodiment 1. Through the steps above, the method of manufacturing a shaft of a cam follower in the present embodiment is completed.

As described above, in the method of manufacturing a shaft of a cam follower in which a heat treatment method using induction hardening apparatus 50 in the present embodiment is adopted, in the induction-hardening step performed as the step (S320), the area to serve as the rolling contact surface or the slide surface of the shaft member is quench-hardened and sufficient durability is provided thereto. In addition, the area of the end portion to be caulked is maintained at hardness allowing caulking without being quench-hardened. Consequently, according to the method of manufacturing a shaft of a cam follower in the present embodiment, the shaft of the roller follower achieving sufficiently improved durability while ensuring sufficient workability of the end portion can be manufactured.

In addition, in the present embodiment, in the step (S320), end surface holding portion 53A of holding member 53 comes in contact with the entire end surface 61 of shaft member 60 and outer circumferential surface holding portion 53B of holding member 53 comes in contact with outer circumferential surface 62 located at the end portion of shaft member 60 over the entire circumference. Thus, since heat can efficiently be radiated to holding member 53 from the entire circumference of the outer circumferential surface of shaft member 60 in contact with holding member 53, the end portion of the shaft member can more reliably be maintained at hardness allowing caulking.

Moreover, in the present embodiment, larger-diameter portion 52B is formed in hollow portion 52A of coil 52. Then, in the step (S320), the area of outer circumferential surface 62 of shaft member 60 distant from the opposing axial ends is subjected to induction heating so as to be opposed to larger-diameter portion 52B, while shaft member 60 is held by holding member 53. Thus, in outer circumferential surface 62 of shaft member 60, a distance between the central portion in the direction of axis and the coil is greater than in the area close to the end portion, and hence occurrence of uneven heating in the direction of axis of shaft member 60 can be suppressed.

Further, in the embodiment above, the step (S320) is preferably performed repeatedly two or more times. Namely, after the step (S310) is performed and before the step (S330) is performed, the step (S320) is preferably performed a plurality of times. Thus, sufficient quench-hardening of the area of shaft member 60 to serve as the rolling contact surface or the slide surface can more reliably be achieved.

Furthermore, in the embodiment above, in the step (S310), shaft member 60 having an axial length greater than a desired axial dimension of quench-hardened shaft member 60 prior to caulking is preferably prepared. Thus, contraction in the direction of axis of shaft member 60 in the step (S320) can be compensated for. In particular, when the step (S320) is performed repeatedly two or more times, an amount of contraction in the step (S320) is great, and hence longer shaft member 60 is preferably prepared.

(Embodiment 11)

Figure 21:
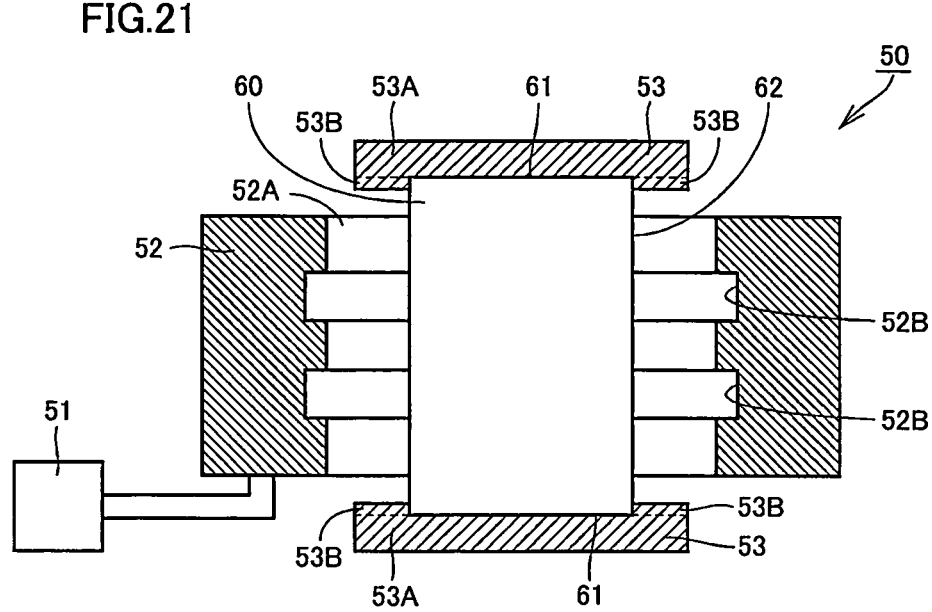
FIG. 21 is a schematic cross-sectional view showing a structure of an induction hardening apparatus in Embodiment 11.

Embodiment 11 representing one embodiment of the present invention will now be described. Referring to FIG. 21, induction hardening apparatus 50 in Embodiment 11 is basically structured and operates similarly to induction hardening apparatus 50 in Embodiment 10 above and achieves similar effects. Induction hardening apparatus 50 in Embodiment 11, however, is different from Embodiment 1 in a structure of coil 52.

Namely, a plurality of (two in the present embodiment) larger-diameter portions 52B aligned in the direction of axis are formed in hollow portion 52A of coil 52 of induction hardening apparatus 50 in Embodiment 11. Referring to FIG. 19, if larger-diameter portion 52B in Embodiment 10 has a longer axial length, hardness of outer circumferential surface 62 in the direction of axis may considerably be varied after quench-hardening, depending on a component composition or the like of steel forming shaft member 60. Specifically, areas having high hardness (or a great quenching depth) are formed in the direction of axis of outer circumferential surface 62 at a plurality of positions (for example, two positions) and a portion therebetween may have low hardness (or a small quenching depth). In other words, a hardened layer pattern may have two peaks. In such a case, by dividing larger-diameter portion 52B in the direction of axis into a plurality of pieces as in the present embodiment, such variation can be suppressed. It is noted that the method of heat treatment of a shaft member using induction hardening apparatus 50 in Embodiment 11 and the method of manufacturing a shaft can be performed as in Embodiment 10.

In addition, though the induction hardening apparatus, the method of heat treatment of a shaft member and the method of manufacturing a shaft described in Embodiments 10 and 11 above are applicable to manufacturing of various shafts of which outer circumferential surface should be hardened and of which workability at an end portion should be maintained at prescribed hardness or lower, they are particularly advantageously applicable to manufacturing of a shaft of which end portion is to be caulked, among shafts of roller followers described in Embodiments 1 to 9 above.

Though an example where larger-diameter portion 52B is formed in hollow portion 52A of coil 52 has been described in Embodiments 10 and 11 above, the present invention is not limited to such a structure and coil 52 without larger-diameter portion 52B being formed may be adopted.

In Embodiments 10 and 11 above, in order to perform appropriate quench-hardening of a shaft member, appropriate conditions for quenching should be set. Factors for setting appropriate conditions include a heating pattern determined by magnitude of a current (or power) supplied to a coil and a time period, the number of times of quenching, positional relation between a coil and a shaft member, a coil shape, a shape of a holding member, and the like. Table 1 shows results obtained when these factors are varied and advantages and disadvantages based on the results.

inner ring) constituting a roller follower of the present invention was conducted. The procedure of the experiment is as follows.

Initially, a method of fabricating a shaft of a roller follower to be tested will be described. In an example of the present invention, SKD11 (Example A) and SUS440C (Example B) defined under JIS were adopted as materials, and solid cylindrical test specimens (shafts of roller followers) each having

TABLE 1

| | Items | Results | Advantages | Disadvantages |
|---|---|---|---|---|
| Heating Pattern | High Temperature and Short Period of Time | Decrease in quench-hardening depth as a result of less thermal conduction to inside | i Increase in compressive stress<br>ii Decrease in time period for treatment<br>iii Prevention of uneven heating as a result of less heat conducting to holding member | i Difficulty in control of hardness and structure after quenching |
| | Low Temperature and Long Period of Time | Increase in quench-hardening depth as a result of increase in thermal conduction to inside | i Relatively easy control of hardness and structure after quenching | i Decrease in compressive stress<br>ii Increase in time period for treatment<br>iii Uneven heating is caused by increase in heat conducting to holding member |
| The Number of Times of Quenching | One | More difficult to obtain prescribed hardened layer pattern | i Decrease in time period for treatment | i Difficulty in setting of heating pattern, holding member, and coil shape |
| | Two or More | More likely to obtain prescribed hardened layer pattern | i Easy setting of heating pattern, holding member, and coil shape | i Increase in time period for treatment |
| Positional Relation Between Coil and Shaft Member | Bringing Coil Closer to Shaft Member | Heated area becomes narrower. Consequently, hardened layer pattern becomes steep. | i Less uneven heating | i Holding member is readily heated. |
| | Moving Coil Away From Shaft Member | Heated area becomes greater. Consequently, hardened layer pattern becomes gentle. | i Holding member is less readily heated. | i More uneven heating |
| Coil Shape | Forming Larger-Diameter Portion | Portion in the vicinity of end portion of shaft member is readily heated. | i Suppressed uneven heating because heat conducting to holding member is compensated for. | i Holding member is readily heated. |
| | Not Forming Larger-Diameter Portion | Center of shaft member is readily heated. | i Holding member is less likely to be heated. | i More uneven heating, because heat conducting to holding member cannot be compensated for |
| Shape of Holding Member | Increasing Projection Height (Grip Width) of Outer Circumferential Surface Holding Portion | Heat conduction from end portion of shaft member increases. | i End surface of shaft member is less likely to be quench-hardened.<br>ii Shaft member is readily fixed. | i More uneven heating because of increase in heat conducting to holding member |
| | Decreasing Projection Height (Grip Width) of Outer Circumferential Surface Holding Portion | Heat conduction from end portion of shaft member is suppressed. | i Suppressed uneven heating because of less heat conducting to holding member | i End surface of shaft member is more readily quench-hardened.<br>ii Difficulty in fixing shaft member |

As shown in Table 1, each factor for setting appropriate quenching conditions has advantages and disadvantages. Therefore, in actually performing quench-hardening treatment of a shaft member, appropriate quenching conditions can be set, in consideration of the advantages and the disadvantages as well as a component composition of a shaft member to be treated, a desired hardened layer pattern, and the like.

EXAMPLE 1

Example 1 of the present invention will be described hereinafter. An experiment for checking durability of a shaft (an inner ring) an outer diameter of 8 mm and a length of 18 mm were fabricated with a manufacturing method similar to the method of manufacturing roller ring 11 and rollers 13 in Embodiment 1.

In the heat treatment process, referring to FIG. 7, for test specimens in Example A for which SKD11 was adopted as the material, temperature $T_6$ was set to 1020° C., time $t_6$ was set to 5 minutes, temperature $T_7$ was set to 170° C., time $t_7$ was set to 2 hours, and the sub zero step, the second tempering step and the low-temperature nitriding step were omitted. On the other hand, for test specimens in Example B for which SUS440C was adopted as the material, temperature $T_6$ was set to 1060° C., time $t_6$ was set to 5 minutes, the first tempering step was omitted, temperature $T_8$ was set to −65° C., time $t_8$ was set to 1.5 hours, temperature $T_9$ was set to 150° C., time $t_9$ was set to 2 hours, and the low-temperature nitriding step was omitted.

In addition, in a Comparative Example out of the scope of the present invention, SUJ2 defined under JIS was adopted, which is generally and conventionally used as a material for a shaft of a roller follower, to fabricate a test specimen having a shape similar to that in the examples above with a manufacturing method similar to the method of manufacturing shaft 12 in Embodiment 1. In the heat treatment process, referring to FIG. 5, temperature $T_1$ was set to 950° C., temperature $T_2$ was set to 180° C., time $t_2$ was set to 2 hours, and the sub zero step, the second tempering step and the low-temperature nitriding step were not performed.

A state of formation of carbide and hardness of the surface portion were checked for the obtained test specimens according to Examples and Comparative Example. The area ratio of carbide was calculated as follows. Initially, the test specimen above was cut at the cross-section perpendicular to the outer circumferential surface and the cross-section was polished. Thereafter, the cross-section was etched with nital or aqua regia and a photograph of an area including the surface of the cross-section was taken by using an electron microscope (SEM). A rectangular area of 120 μm×100 μm was adopted as a field for photographing. Then, a photograph image was analyzed with image processing software to calculate the area ratio of carbide having an area not smaller than 12.6 μm². In addition, regarding hardness at the surface portion, the test specimen above was cut at the cross-section perpendicular to the outer circumferential surface, the cross-section was polished, and hardness at three positions distant by 0.05 mm from the outer circumferential surface was measured by using a sclerometer, and an average value thereof was calculated. Table 2 shows area ratios of carbide and results of measurement of hardness.

TABLE 2

| Type of Steel | Area Ratio of Carbide Having Area Not Smaller Than 12.6 μm² (%) | Hardness (HRC) |
| --- | --- | --- |
| SKD11 (Example A) | 6.8 | 62.2 |
| SUS440C (Example B) | 8.3 | 60.5 |
| SUJ2 (Comparative Example) | 0 | 62.6 |

Referring to Table 2, hardness at the surface portion of the test specimens in Examples was equivalent to or lower than that of the test specimen in Comparative Example. On the other hand, carbide having an area of 12.6 μm² or greater was generated at the area ratio of 5.0% or higher at the surface (the rolling contact surface) of the test specimens in Examples, whereas no carbide having an area of 12.6 μm² or greater was observed at the surface (the rolling contact surface) of the test specimen in Comparative Example. It is noted that carbide having an area of approximately 4 μm² or smaller, which is smaller than 12.6 μm², was formed at the surface of the test specimen in Comparative Example at the area ratio of approximately 30%, as a result of analysis above.

A test method in a test for checking durability of the test specimens above will now be described. Durability of the test specimens above was tested by using a shell-type radial load test machine capable of testing durability of a shaft (an inner ring) by rotating an outer ring (a roller ring) while the shaft is fixed.

Figure 22:
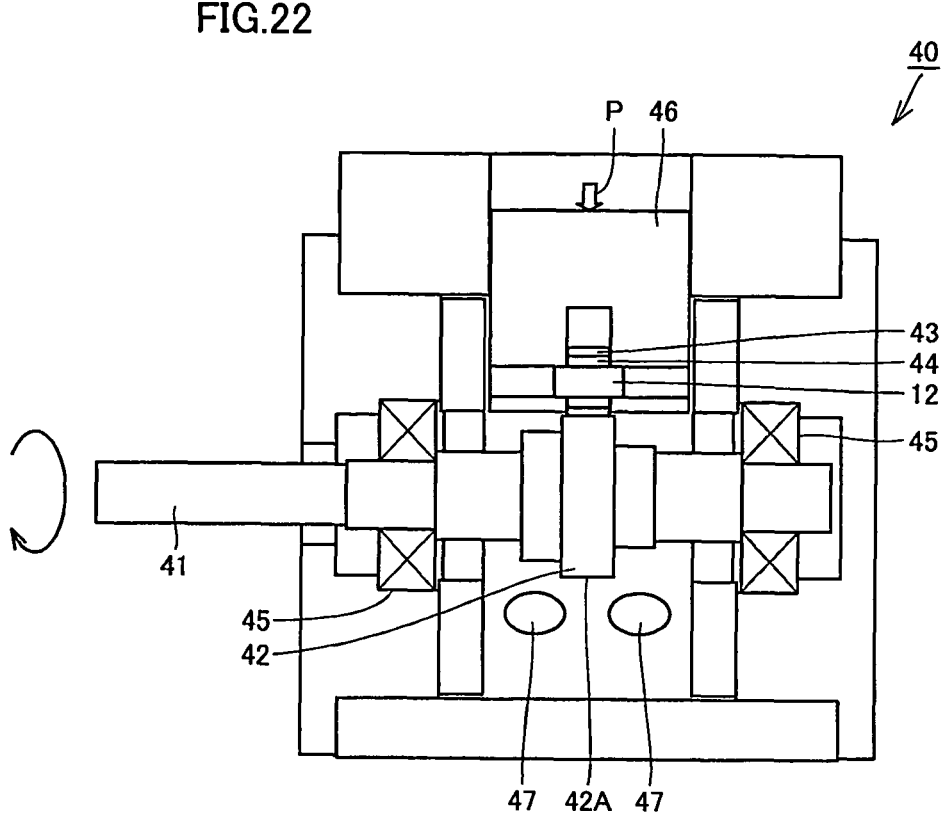
FIG. 22 is a schematic diagram showing a structure of a shell-type radial load test machine.

Initially, a structure of a shell-type radial load test machine will be described. Referring to FIG. 22, a shell-type radial load test machine 40 includes a rotation shaft 41 connected to a not-shown motive power source, a disc-shaped drive roller 42 structured to be rotatable together with rotation shaft 41, which passes through an area including a center thereof, and a pair of bearings 45 rotatably supporting rotation shaft 41 around an axis.

Then, an annular outer ring 43 is arranged such that its outer circumferential surface is in contact with an outer circumferential surface 42A of drive roller 42, and a plurality of rollers 44 are arranged such that their outer circumferential surfaces come in contact with an inner circumferential surface of outer ring 43. Outer ring 43 and rollers 44 are made of quench-hardened SUJ2 defined under JIS. In addition, shaft 12 of the roller follower, to be tested as the test specimen, is arranged to pass through outer ring 43 and come in contact with rollers 44 at the rolling contact surface which is the outer circumferential surface thereof. Moreover, a load transmission member 46 is arranged to be in contact with opposing sides of shaft 12 projecting from outer ring 43. Consequently, load P is applied to load transmission member 46, so that shaft 12 is pressed against rollers 44 under load P. Further, shell-type radial load test machine 40 includes a cartridge heater 47, which can control a temperature of oil serving as a lubricant.

An operation of shell-type radial load test machine 40 will now be described. When rotation shaft 41 rotates around the axis by means of a not-shown motive power source, drive roller 42 rotates together with rotation shaft 41. Then, driven by drive roller 42, outer ring 43 rotates. Consequently, rollers 44 roll over the rolling contact surface (the outer circumferential surface) of shaft 12 of the roller follower. In addition, the temperature of oil serving as the lubricant is controlled by cartridge heater 47. Here, when load P is transmitted to shaft 12 through load transmission member 46, shaft 12 is pressed against rollers 44 while it is fixed. Thus, the area of shaft 12 pressed against rollers 44 (the area on the side facing outer circumferential surface 42A of drive roller 42) becomes a loaded area (an area receiving load P). On the other hand, since rollers 44 and outer ring 43 rotate around shaft 12, the entire rolling contact surface (the outer circumferential surface of rollers 44 and the inner circumferential surface of outer ring 43) becomes a loaded area. Consequently, shaft 12 of which loaded area is limited to a narrow range is tested under conditions severer than those for rollers 44 and outer ring 43, and durability of shaft 12 at a desired oil temperature can be examined.

Test conditions will now be described. Applied load P was set to 10% of basic dynamic rated load of a test bearing constituted of shaft 12, rollers 44 and outer ring 43, and a speed of outer ring 43 was set to 2200 rpm. Oil obtained by introduction of carbon black powders in CD-grade 10W-30 diesel engine oil followed by stirring so that 16 mass % carbon black powders with respect to the total amount of the oil and carbon black were dispersed without settling out was adopted as the lubricant oil. These carbon black powders simulate soot particles introduced in the roller follower under the conditions for use of the roller follower. In addition, the oil temperature was set to 100° C. and the test time period was set to 60 hours. Moreover, oil bath lubrication was adopted as lubrication, and an area not higher than a shaft core of a test bearing was immersed in the oil. After the test time period of 60 hours elapsed, shaft 12 was taken out of shell-type radial load test machine 40, a depth of wear at the outer circumferential surface (the rolling contact surface) was measured, and a state of the outer circumferential surface (the rolling contact surface) was observed with the SEM, so as to examine a worn state of the rolling contact surface.

Figure 23:
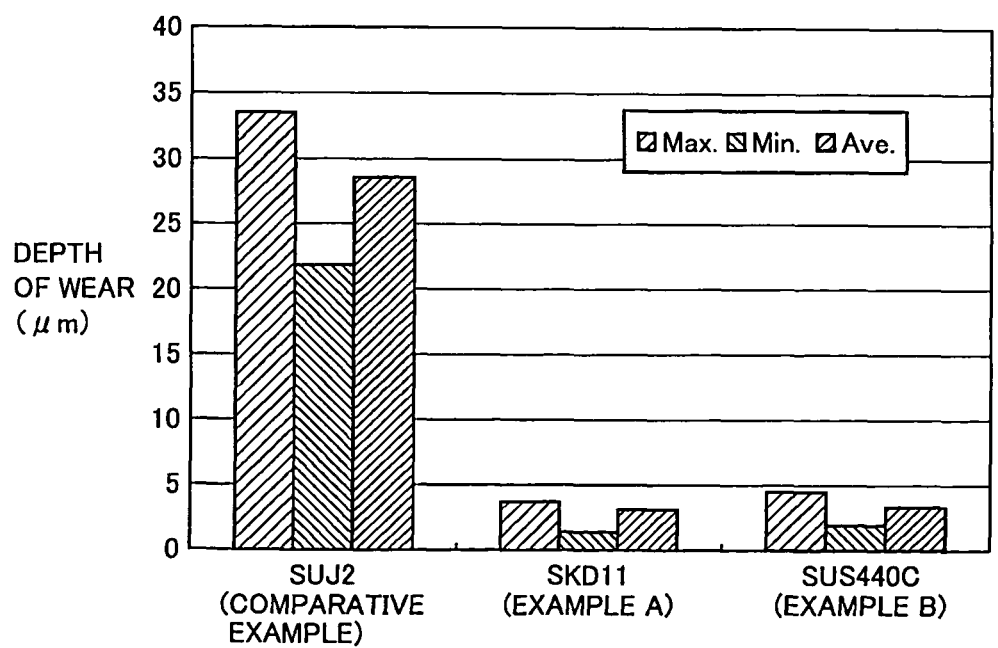
FIG. 23 is a diagram showing a depth of wear in an outer circumferential surface of a shaft after a test ended.
Figure 24:
FIG. 24 is an SEM photograph showing a state of the outer circumferential surface in a Comparative Example (SUJ2) before the test.
Figure 25:
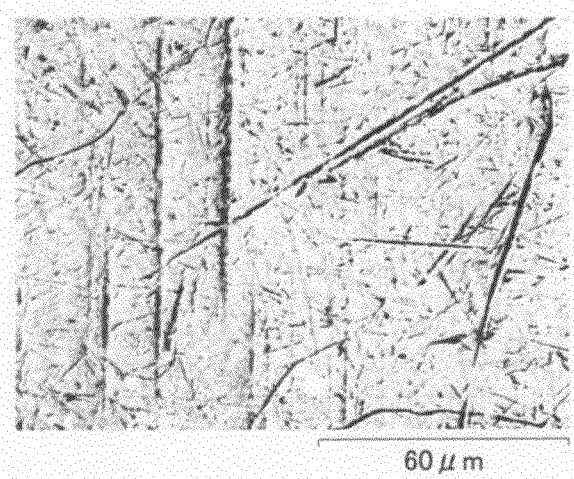
FIG. 25 is an SEM photograph showing a state of the outer circumferential surface in Comparative Example (SUJ2) before the test.
Figure 26:
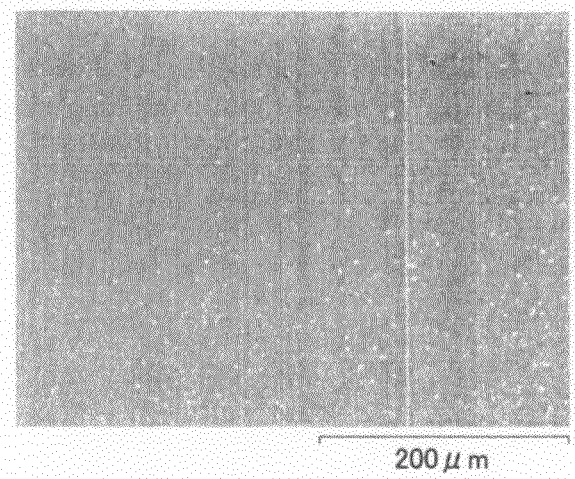
FIG. 26 is an SEM photograph showing a state of the outer circumferential surface in Comparative Example (SUJ2) after the test.
Figure 27:
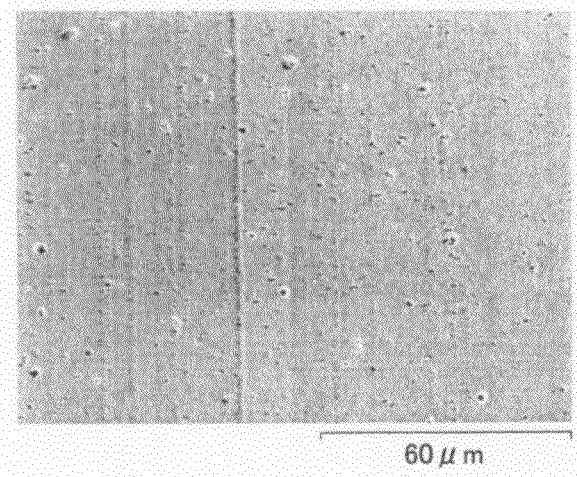
FIG. 27 is an SEM photograph showing a state of the outer circumferential surface in Comparative Example (SUJ2) after the test.
Figure 28:
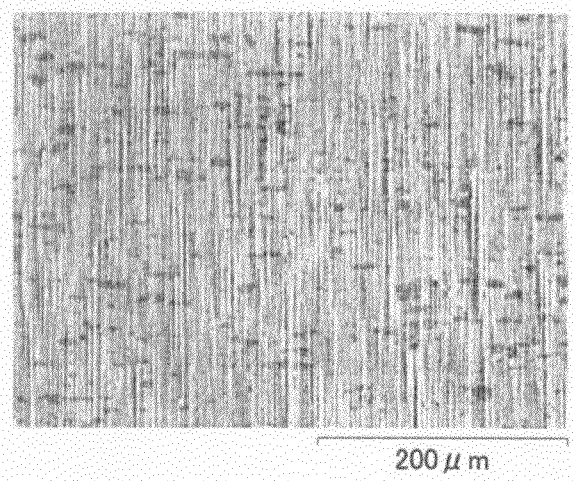
FIG. 28 is an SEM photograph showing a state of the outer circumferential surface in an Example A (SKD11) before the test.
Figure 29:
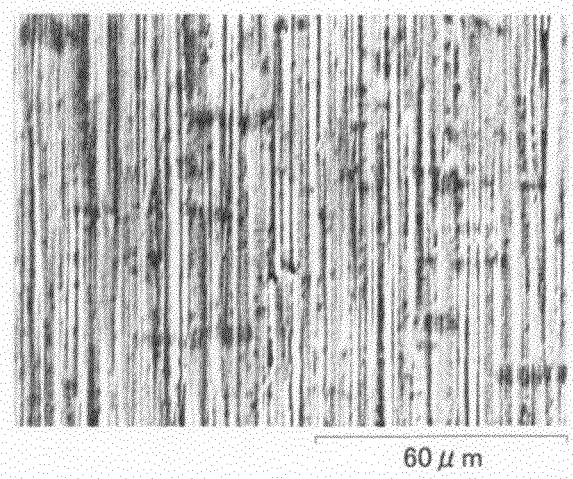
FIG. 29 is an SEM photograph showing a state of the outer circumferential surface in Example A (SKD11) before the test.
Figure 30:
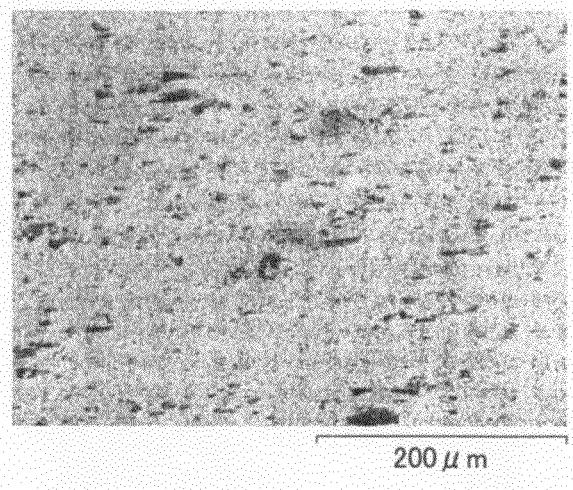
FIG. 30 is an SEM photograph showing a state of the outer circumferential surface in Example A (SKD11) after the test.
Figure 31:
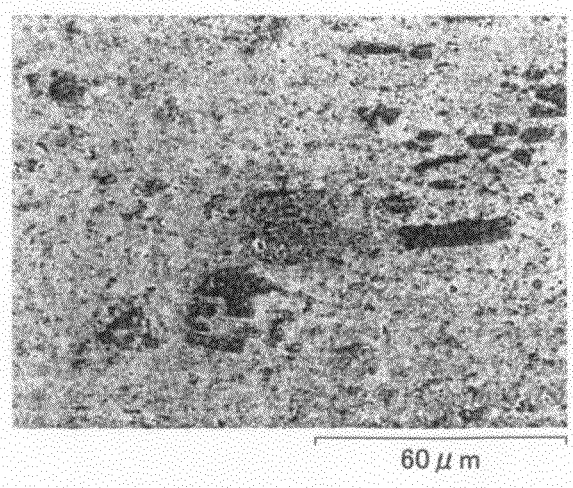
FIG. 31 is an SEM photograph showing a state of the outer circumferential surface in Example A (SKD11) after the test.
Figure 32:
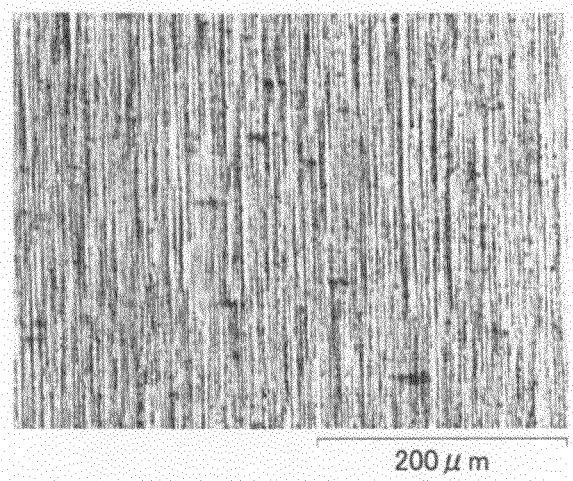
FIG. 32 is an SEM photograph showing a state of the outer circumferential surface in an Example B (SUS440C) before the test.
Figure 33:
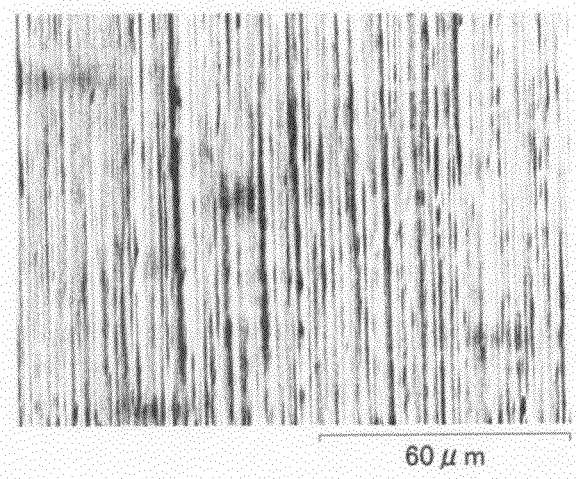
FIG. 33 is an SEM photograph showing a state of the outer circumferential surface in Example B (SUS440C) before the test.
Figure 34:
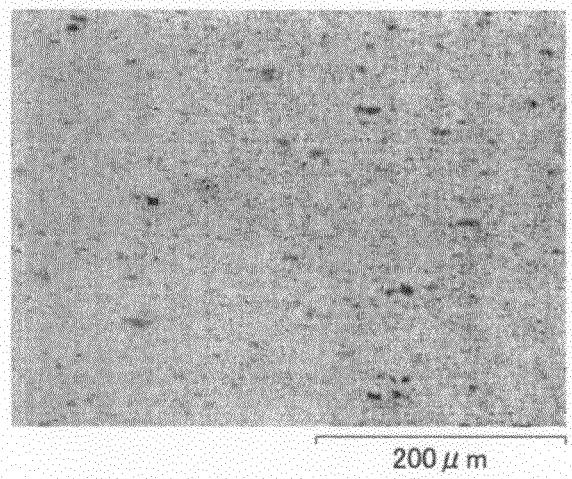
FIG. 34 is an SEM photograph showing a state of the outer circumferential surface in Example B (SUS440C) after the test.
Figure 35:
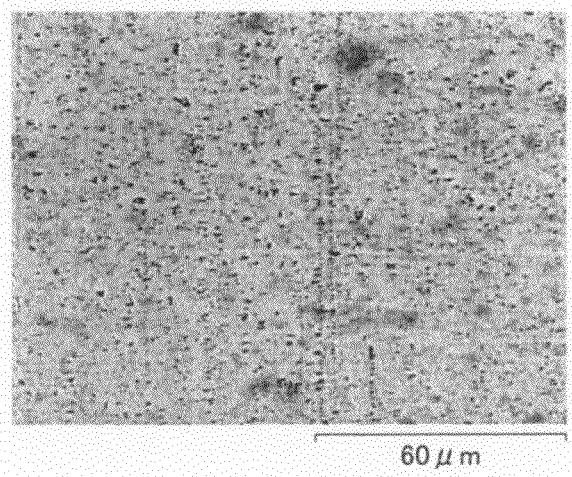
FIG. 35 is an SEM photograph showing a state of the outer circumferential surface in Example B (SUS440C) after the test.
Figure 36:
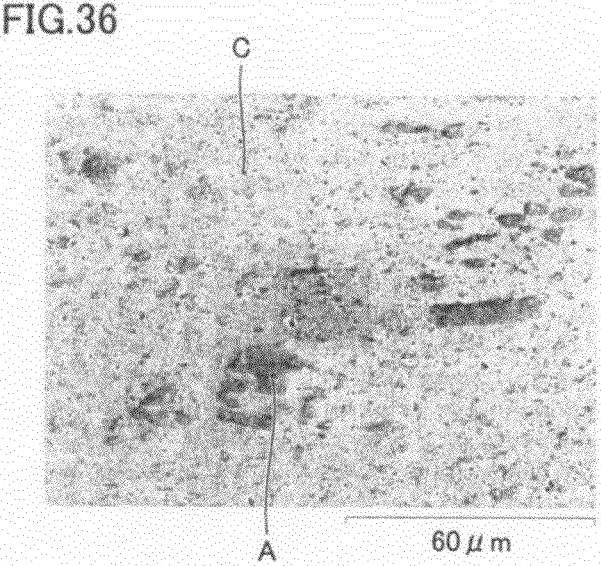
FIG. 36 is an SEM photograph showing an analysis point in EDX analysis in Example A (SKD11).
Figure 37:
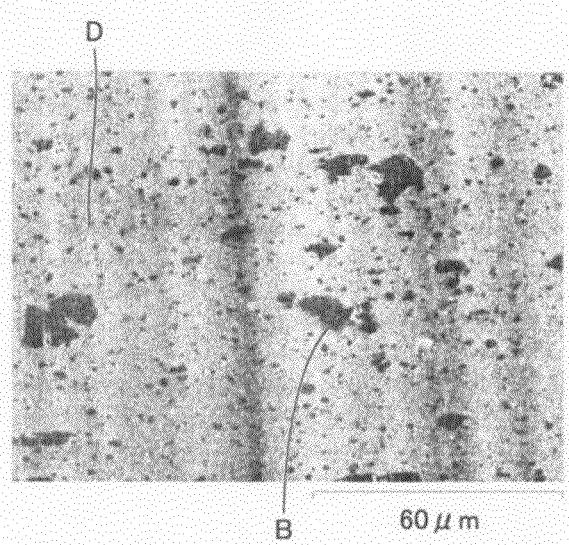
FIG. 37 is an SEM photograph showing an analysis point in EDX analysis in Example B (SUS440C).
Figure 38:
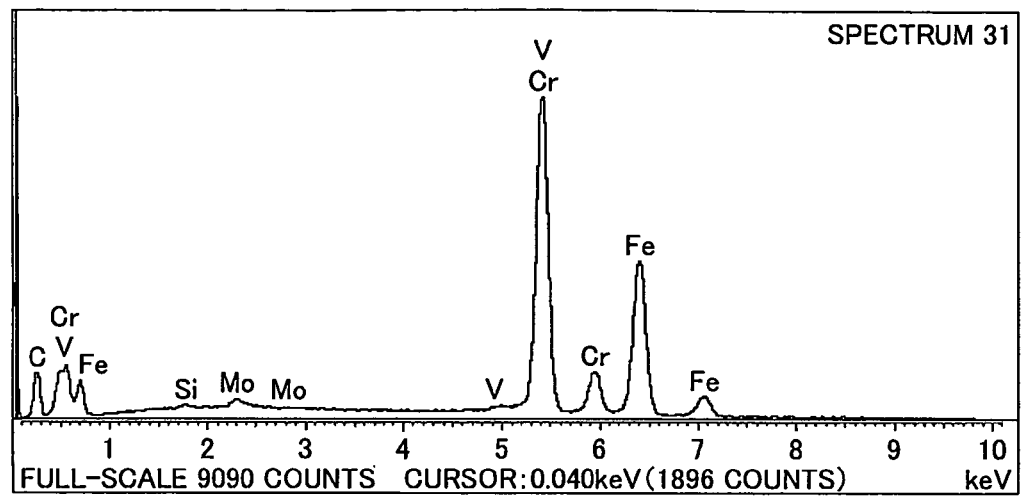
FIG. 38 is a diagram showing results of EDX analysis at a point A in FIG. 36.
Figure 39:
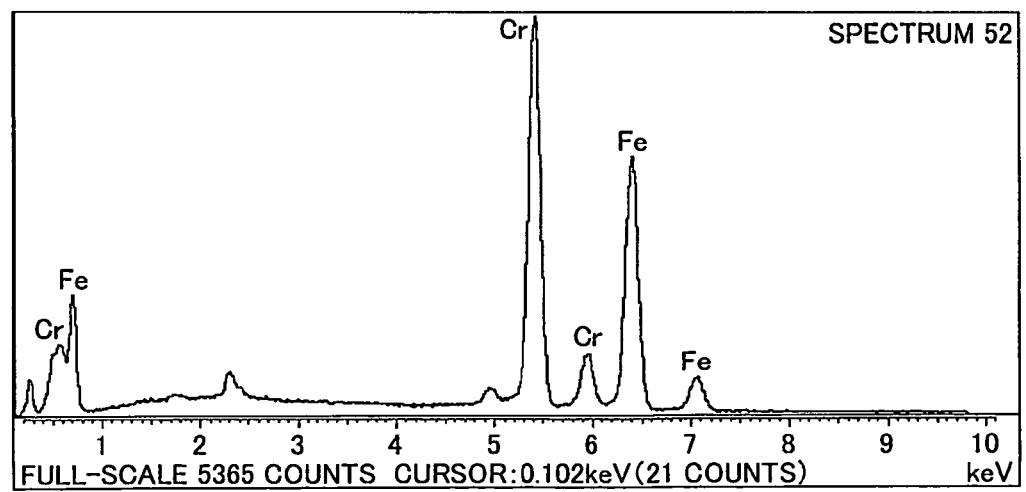
FIG. 39 is a diagram showing results of EDX analysis at a point B in FIG. 37.
Figure 40:
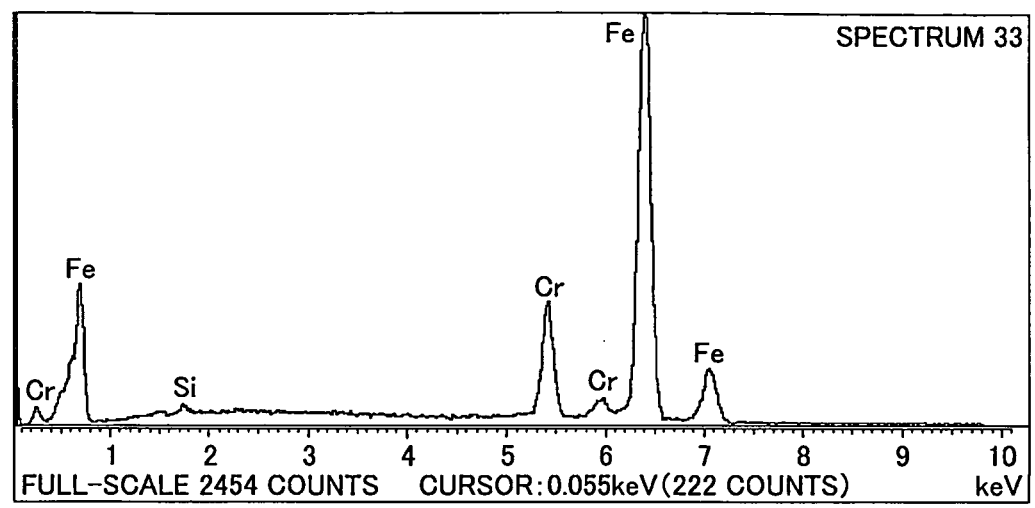
FIG. 40 is a diagram showing results of EDX analysis at a point C in FIG. 36.
Figure 41:
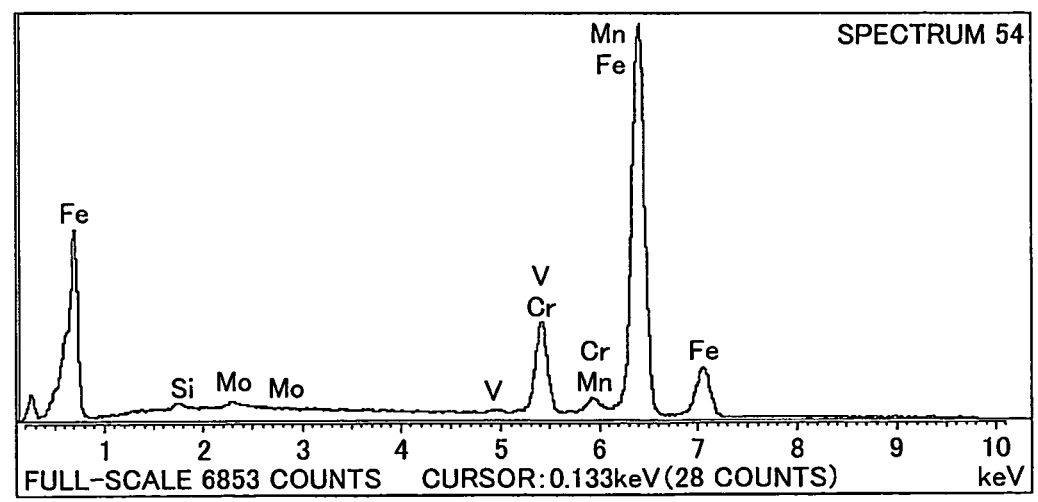
FIG. 41 is a diagram showing results of EDX analysis at a point D in FIG. 37.

Results of experiments will now be described. Initially, results of measurement of a depth of wear will be described. In FIG. 23, the ordinate represents a depth of wear, and a maximum value (Max.), a minimum value (Min.) and an average value (Ave.) of the depth of wear in Comparative Example, Example A and Example B are shown side by side. It is noted that a depth of wear was calculated as follows. Initially, for each of Comparative Example, Example A and Example B, fifteen test specimens (shafts) that had completed the test above were prepared, and a height of a surface in a direction along the direction of axis of the shaft after the test was measured by using a surface roughness measurement apparatus. Based on the measurement results, a maximum value of difference in height between the rolling contact surface and an area other than the rolling contact surface was examined and recorded as a depth of wear. Then, the maximum value (Max.), the minimum value (Min.) and the average value (Ave.) of the depth of wear in fifteen test specimens in each example were calculated.

Referring to FIG. 23, in spite of the fact that surface hardness is equal to or lower than that in Comparative Example, the test specimens in Example A and Example B are significantly smaller in depth of wear than the test specimens in Comparative Example. More specifically, the average value of the depths of wear in Examples was suppressed to approximately 1/7 of Comparative Example. It was confirmed from this result that durability of the shaft constituting the roller follower according to the present invention was significantly improved as compared with the conventional shaft.

A worn state of the outer circumferential surface (the rolling contact surface) of the shaft will now be described. Referring to FIGS. 24 to 35, it can be seen that, in the outer circumferential surface of the shaft after the test, scratches resulting from polishing that had existed before the test disappeared and a large number of recesses were formed. Since a recess and a particles size of carbon black powder introduced in the oil during the test correspond to each other, it is assumed that the recesses are wear dents or indentations formed by carbon black powders. It can thus be considered that wear of the shaft progresses due to soot particles when soot particles that are hard carbon particles similar to carbon black powders are introduced in the lubricant oil. In addition, it can be seen in the SEM photographs after the test that, in an area darker in color than surroundings, there are fewer wear dents or indentations that seem to have been formed by carbon black powders.

On the other hand, referring to FIGS. 36 to 41, it can be seen that, at a point A and a point B each included in an area darker in color than the surroundings above, as compared with points C and D representing other areas, a large amount of carbide-forming element such as chromium (Cr), molybdenum (Mo), vanadium (V), or the like is present. Namely, the area is considered as an area where carbide was formed. Therefore, taking into account the fact that there were fewer wear dents or indentations in the area as described above, in the shafts in Examples which are the shafts of the roller followers according to the present invention, it is considered that carbide higher in hardness than the matrix was present so that wear caused by carbon black powders was suppressed and durability was improved. In contrast, it is considered that, in the shaft made of SUJ2 according to Comparative Example, carbide was present, however, the size thereof was insufficient. More specifically, carbide having an area of 12.6 $\mu m^2$ or greater was not sufficiently present, and hence wear caused by carbon black powders was not suppressed and durability was not improved.

It was confirmed from the experiment results above that, according to the roller follower of the present invention, a roller follower excellent in durability in an environment in which soot particles are introduced in lubricant oil can be provided.

EXAMPLE 2

Example 2 of the present invention will be described hereinafter. An experiment where appropriate quenching conditions are set in quench-hardening treatment of a shaft member using the induction hardening apparatus according to the present invention was conducted. The procedure of the experiment is as follows.

A cylindrical member having a diameter of 10 mm and a height of 20 mm was prepared as a test specimen which is a shaft member. SKD11 and SUS440C defined under JIS were adopted as steel forming the test specimen. In addition, a target hardened layer pattern to be provided to the shaft member was set such that, in the direction of axis of the outer circumferential surface, hardness of HRC 30 or lower was set at a position distant from the end surface by 1 mm and distant from the surface by 0.05 mm, hardness of HRC 55 or higher was set at a position distant from the end surface by 3 mm and distant from the surface by 0.05 mm, with a depth of hardening not lower than HV 550 being set to 0.5 mm or greater, and hardness of HRC 58 or higher was set at a position distant from the end surface by 10 mm and distant from the surface by 0.05 mm, with a depth of hardening not lower than HV 550 being set to 0.7 mm or greater. In addition, induction hardening apparatus 50 described with reference to FIG. 19 was adopted as the induction hardening apparatus to be used in the experiment.

Figure 42:
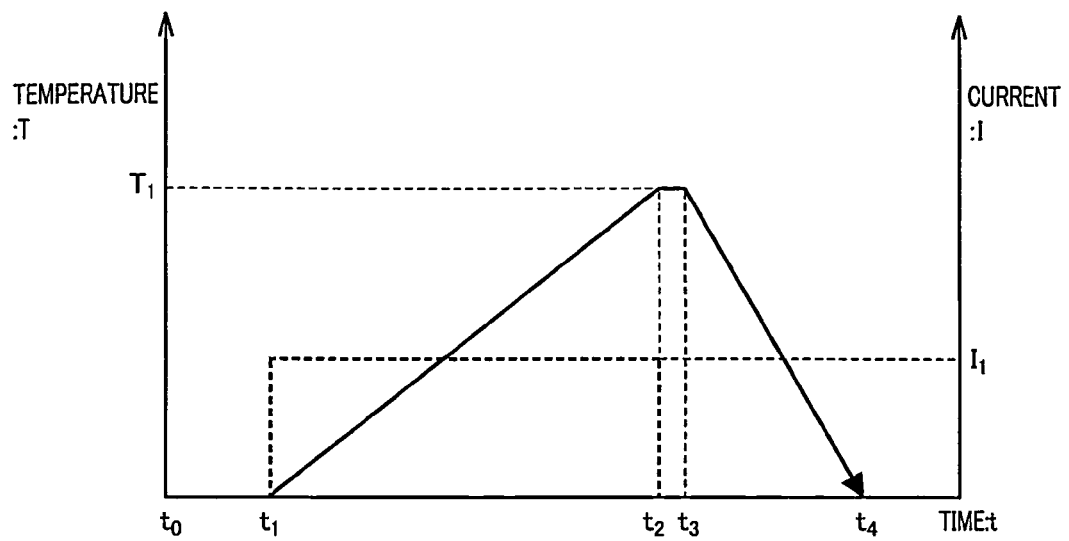
FIG. 42 is a diagram showing a heating pattern adopted in Example 2.

FIG. 42 shows a heating pattern adopted in Example 2. In FIG. 42, the abscissa represents a time, and lapse of time is indicated toward the right. In addition, in FIG. 42, the ordinate on the left represents a heating temperature of the shaft member and a higher temperature is indicated toward the top. Moreover, the ordinate on the right in FIG. 42 represents a value of a current fed to a coil, and a larger current value is indicated toward the top. Further, a solid line in the figure represents a surface temperature at the central portion of the outer circumferential surface of the shaft member, and a bold dashed line represents a value of a current fed to the coil.

Referring to FIGS. 42 and 19, in the present example, the test specimen was subjected to quenching treatment in accordance with the following procedure. Namely, at time $t_0$, rotation of shaft member 60 (the test specimen) around the axis was started, and at time $t_1$, a current $I_1$ was fed to coil 52. Here, the current fed to coil 52 was maintained constant at current $I_1$ until time $t_2$. Thus, the temperature of the test specimen continued to increase until time $t_2$ and reached temperature $T_1$ at time $t_2$. Thereafter, at time $t_2$, the current was set to 0 so as to end heating of the test specimen. Then, after a time lag (for 0.5 second), the test specimen was sprayed with water from time $t_3$ to $t_0$ (for 5 seconds) for cooling. This quenching treatment was repeated a plurality of times, as necessary. Then, appropriate quenching conditions were derived by varying a heating temperature for the test specimen, a heating time period, a shape of a coil, the number of times of quenching, and the like.

Figure 43:
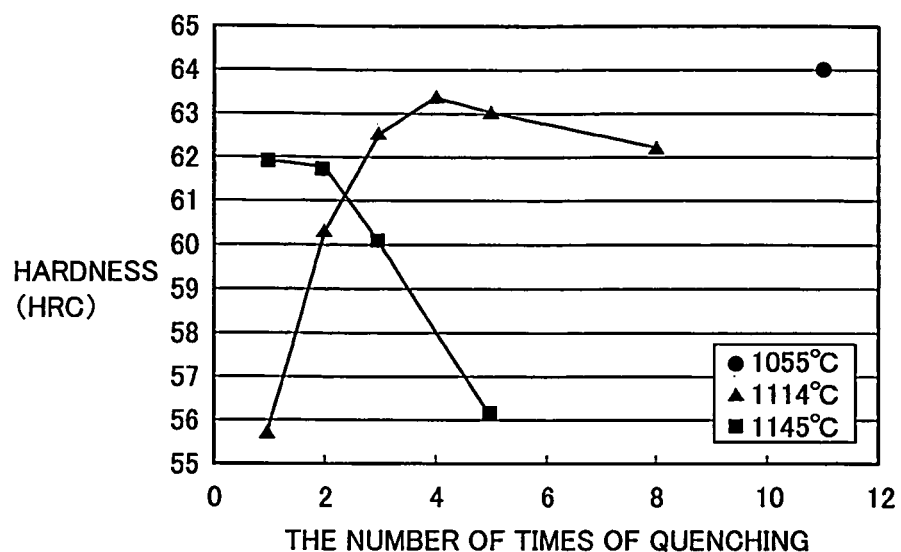
FIG. 43 is a diagram showing relation between the number of times of quenching and hardness when a heating temperature is set to 1055° C. to 1145° C. and a heating time period is set to 0.9 second.
Figure 44:
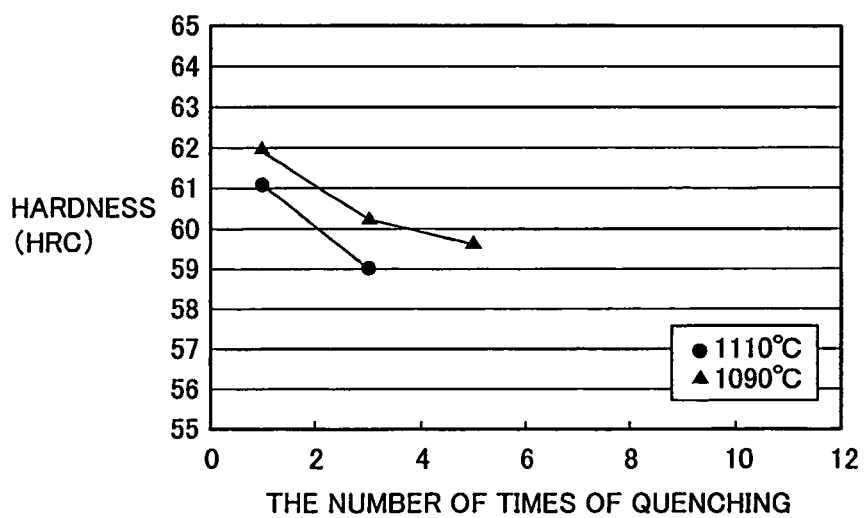
FIG. 44 is a diagram showing relation between the number of times of quenching and hardness when a heating temperature is set to 1090° C. to 1110° C. and a heating time period is set to 5 seconds.

Results of experiments, in which relation between the number of times of quenching treatment (the number of times of quenching) and hardness of test specimens after completion of the treatment with a heating temperature (temperature $T_1$) being varied for test specimens made of SKD11 in accordance with the procedure above was examined, will now be described. In FIGS. 43 and 44, the abscissa represents the number of times of quenching and the ordinate represents hardness. Here, referring to FIG. 42, the heating temperature refers to temperature $T_1$ and the heating time period refers to a period from time $t_1$ to time $t_2$. Meanwhile, hardness refers to hardness measured at the central portion in the direction of axis of the outer circumferential surface of the shaft member.

Referring to FIG. 43, under the condition of the heating time period of 0.9 second intending surface quenching for quench-hardening only the surface of the shaft member, with the heating temperature being set to 1055° C., hardness did not increase unless the number of times of quenching was increased and hardness of approximately HRC 64 was obtained after eleven times of quenching. Meanwhile, with the heating temperature being set to 1114° C. as well, in order to obtain sufficient hardness, quenching two or more times was necessary and high hardness not lower than HRC 62 was obtained by performing quenching three to eight times. On the other hand, when the heating temperature was increased to 1145° C., hardness lowered with the increase in the number of times of quenching. This may be because too low a heating temperature makes solution of carbide of iron and chromium in steel into a matrix difficult and an extremely large number of times of quenching becomes necessary for obtaining high hardness, whereas too high a heating temperature leads to increase in an amount of retained austenite and resulting low hardness. Namely, it can be said that quenching quality of SKD11 is very sensitive to a quenching temperature and a heating time period. On the other hand, referring to FIG. 44, under the condition of the heating time period of 5 seconds intending quenching as a whole for quench-hardening of the entire shaft member, with the heating temperature being set to 1090° C., sufficient hardness was obtained by performing quenching once, and increase in the number of times of quenching rather leads to tendency of lower hardness. Meanwhile, when the quenching temperature was increased to 1110° C., hardness was lower than in the case where the temperature was set to 1090° C.

It was found from the results above that, when surface quenching is intended, it is appropriate to set a heating temperature to 1114 to 1145° C. in consideration of the fact that the number of times of quenching exceeding five makes application to actual production processes difficult, and when quenching as a whole is intended, it is appropriate to set a heating temperature to 1090° C. or lower. In addition, it is considered as appropriate to set a heating temperature to approximately 1090 to 1114° C. when a heating time period is somewhere between 0.9 second and 5 seconds.

Figure 45:
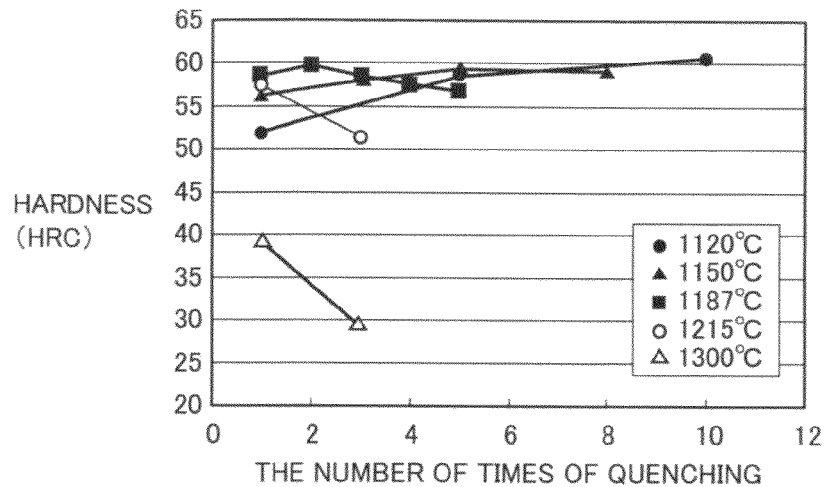
FIG. 45 is a diagram showing relation between the number of times of quenching and hardness when a heating temperature is set to 1120° C. to 1300° C. and a heating time period is set to 3 seconds.

Then, as in the case of SKD11, results of experiments, in which relation between the number of times of quenching treatment (the number of times of quenching) and hardness of test specimens after completion of the treatment with a heating temperature being varied for test specimens made of SUS440C was examined, will now be described. In FIG. 45, the abscissa represents the number of times of quenching and the ordinate represents hardness.

Referring to FIG. 45, when the heating temperature was set to 1300° C., sufficient hardness was not obtained regardless of the number of times of quenching. On the other hand, when the heating temperature was set to 1215° C. as well, hardness was slightly insufficient and increase in the number of times of quenching led to tendency of further lowering in hardness. Meanwhile, when the heating temperature was set to 1120 to 1187° C., sufficient hardness was obtained with the number of times of quenching not greater than five. It was thus found that it is appropriate to set the heating temperature to 1120 to 1187° C. when surface quenching is intended.

Then, trial-and-error experiments for forming a target hardened layer pattern were conducted for test specimens (shaft members) made of SKD11 under the condition of a heating temperature from 1090 to 1114° C. considered as appropriate as a result of the experiments above, with a heating time period, a shape of a coil or the like being varied. Table 3 shows conditions for the experiments.

TABLE 3

| Condition | Current (A) | Heating Time Period (s) | Heating Temperature (° C.) | Coil Shape |
|---|---|---|---|---|
| A | 390 | 3 | 1111 | No larger-diameter portion was present in area within 5-mm range from upper and lower ends of coil. Depth of larger-diameter portion was set to 0.5 mm. |
| B | | | 1097 | No larger-diameter portion was present in area within 3-mm range from upper and lower ends of coil. Depth of larger-diameter portion was set to 0.75 mm. |
| C | 720 | 1 | 1140 | |
| D | | 1.5 | 1130 | No larger-diameter portion was present in area within 2-mm range from upper and lower ends of coil. Depth of larger-diameter portion was set to 0.75 mm. |
| E | 730 | 1 | 1130 | |
| F | 788 | 0.9 | 1140 | |
| G | 700 | 1.1 | 1130 | |

Referring to Table 3, initially, the quench-hardening treatment of test specimens was performed under the condition that the heating time period was set to 3 seconds and a current value was set to 390 A (condition A in Table 3). Consequently, it was found that, under this condition, surface quenching was not achieved in the central portion in the direction of axis of the test specimen but hardening as far as the central portion resulted. In addition, it was found that difference in hardness between the central portion in the direction of axis of the outer circumferential surface of the test specimen to serve as the rolling contact surface and a position distant from the end surface by 3 mm was significant, leaving room for improvement. Moreover, this tendency remained the same even when the number of times of quenching was increased to three.

In order to reduce the difference in hardness above, the quench-hardening treatment was performed under the condition that an axial length and a depth of the larger-diameter portion were increased (condition B in Table 3). Consequently, though the difference in hardness above exhibited tendency of decrease, it was not necessarily sufficient, leaving room for further improvement.

Then, treatment at a high temperature for a short period of time was performed while the shape of the coil was maintained, the current value was increased and the heating time period was reduced (condition C in Table 3). However, the result showed that the difference in hardness above did not sufficiently decrease and surface hardness at the central portion in the direction of axis was not sufficient either.

direction of axis. Using this induction hardening apparatus, the quench-hardening treatment of test specimens made of SKD11 was performed under the conditions shown in Table 4. Since it was found from the experiments above that, referring to FIG. 21, a height of projection of outer circumferential surface holding portion 53B from end surface holding portion 53A in holding member 53 (a width of grip of the shaft member by the holding member) is preferably not greater than a width from the end surface of the area of the shaft member where quench-hardening should be avoided, the height was set to 1 mm. In addition, regarding larger-diameter portion 52B, two larger-diameter portions 52B each having an axial length of 4 mm were aligned in the direction of axis and an area having a 3-mm length where larger-diameter portion 52B is not formed was arranged between two larger-diameter portions 52B.

TABLE 4

| Condition | Current Value, Heating Time Period, the Number of Times of Quenching | Remarks |
| --- | --- | --- |
| A | 810 A × 0.8 s × 5 times | Highest Temperature |
| B | 860 A × 0.8 s × 1 time | Reached |
| C | 860 A × 0.8 s × 1 time + 810 A × 0.8 s × 1 time | 810 A × 0.8 s: 1130° C. |
| D | 860 A × 0.8 s × 1 time + 810 A × 0.8 s × 2 times | 820 A × 0.8 s: 1135° C. |
| E | 860 A × 0.8 s × 1 time + 810 A × 0.8 s × 3 times | 840 A × 0.8 s: 1150° C. |
| F | 860 A × 0.8 s × 1 time + 820 A × 0.8 s × 2 times | 860 A × 0.8 s: 1180° C. |

Further, treatment in which a heating time period and a heating temperature were varied while the shape of the coil was varied to increase an axial length of the larger-diameter portion was performed (conditions D to G in Table 3). The target hardened layer pattern above, however, was not completely achieved. In addition, under this condition, it was found that the hardened layer pattern exhibited two peaks.

Figure 46:
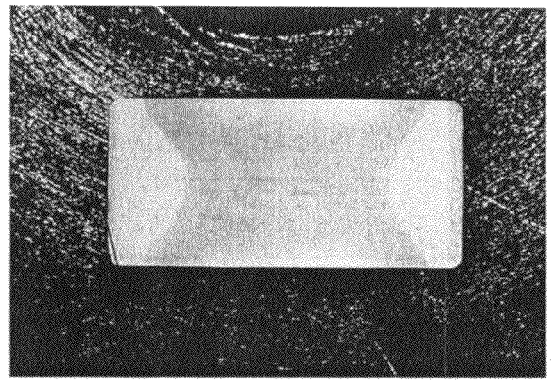
FIG. 46 is a photograph showing a hardened layer pattern of a test specimen quench-hardened under a condition C in Table 3.
Figure 47:
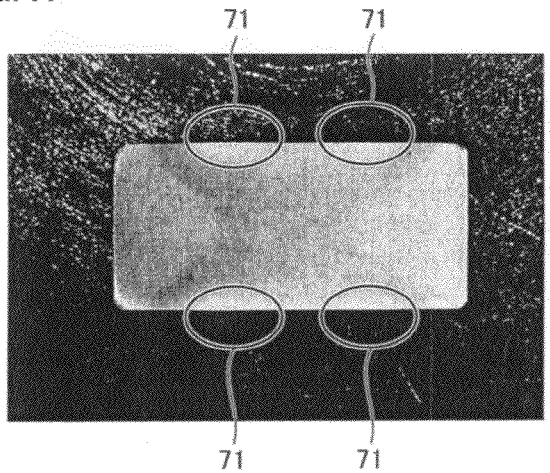
FIG. 47 is a photograph showing a hardened layer pattern of a test specimen quench-hardened under a condition F in Table 3.

Here, photographs in FIGS. 46 and 47 are each photographs of hardened layer patterns visualized by cutting the test specimen after the quench-hardening treatment at the cross-section including the axis, thereafter polishing the cut cross-section, and etching the polished cut cross-section with an etchant.

Referring to FIGS. 46 and 47, an excessive axial length of the larger-diameter portion formed in the coil leads to a two-peak shape of the hardened layer pattern as in an area 71 shown in FIG. 47. This is because the heating temperature at the central portion in the direction of axis of the outer circumferential surface of the test specimen was lower than in the area around the central portion. If such a hardened layer pattern is provided to the shaft member and used, for example, as a shaft of a roller follower, durability may be insufficient. Therefore, the hardened layer pattern having two peaks is desirably eliminated.

Figure 48:
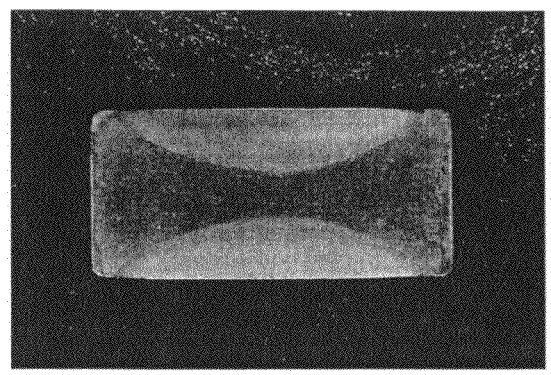
FIG. 48 is a photograph showing a hardened layer pattern of a test specimen quench-hardened under a condition A in Table 4.

In order to eliminate the hardened layer pattern having two peaks, the induction hardening apparatus described with reference to FIG. 21 in Embodiment 11 above was used to perform the quench-hardening treatment of similar test specimens. As described above, in the induction hardening apparatus, larger-diameter portion 52B is divided into two in the Consequently, it was found that the target hardened layer pattern to be provided to the shaft member above was obtained under conditions A and F in Table 4. A photograph in FIG. 48 was taken in the procedure similar to those in FIGS. 46 and 47 above. Referring to FIG. 48, it is confirmed that, in the cross-section of the test specimen, non-hardened areas are present at the end portions in the direction of axis (corresponding to left and right end portions in the photograph) and a hardened layer decreasing in its depth toward the end portions is formed in the central portion in the direction of axis.

Figure 49:
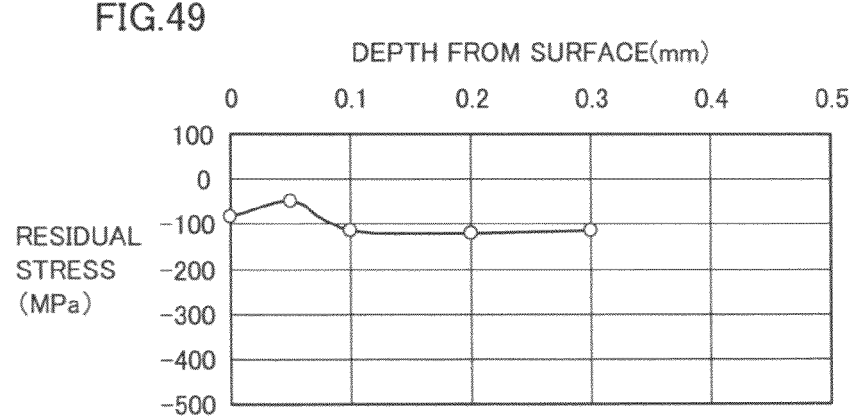
FIG. 49 is a diagram showing residual stress distribution in a test specimen heated to 150° C. to be tempered.
Figure 50:
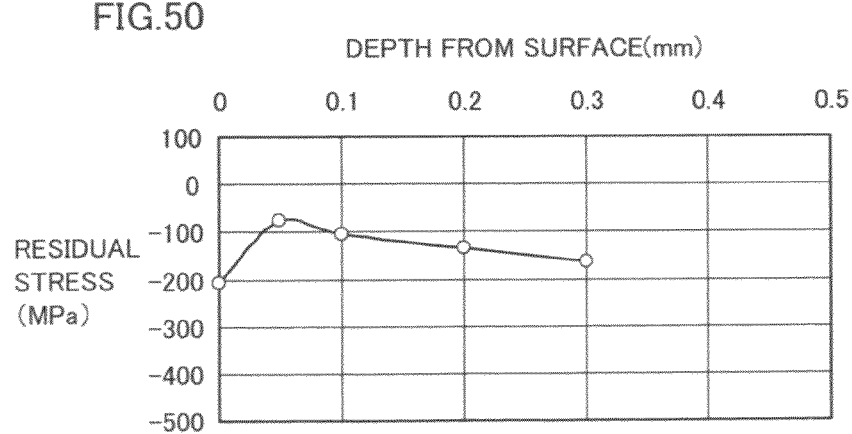
FIG. 50 is a diagram showing residual stress distribution in a test specimen heated to 170° C. to be tempered.

In addition, distribution of residual stress in the central portion in the direction of axis around the outer circumferential surface of the test specimen quench-hardened under condition A in Table 4 was examined. In FIGS. 49 and 50, residual stress is expressed in such a manner that tensile stress is expressed as positive and compressive stress is expressed as negative.

Referring to FIGS. 49 and 50, at the surface portion of the outer circumferential surface of the test specimen quench-hardened under condition A in Table 4, compressive stress of approximately 100 MPa remains regardless of a tempering temperature. Since residual compressive stress at the surface portion has an effect to suppress occurrence or development of a crack at the surface portion, it can be said that the surface portion of the test specimen is quench-hardened to a preferable state.

Here, comparing condition A with condition F in Table 4, condition F is smaller in the number of times of quenching than condition A, and can contribute to cost reduction. On the other hand, condition A achieved higher hardness in the area except for the end portions, than condition F. Thus, in actually determining treatment conditions, condition A or condition F can be selected, in consideration of allowable cost and required characteristics.

Meanwhile, the induction hardening apparatus having the structure the same as in Embodiment 11 above was used to subject test specimens made of SUS440C to quench-hardening treatment under the conditions shown in Table 5.

TABLE 5

| Condition | Current Value, Heating Time Period, the Number of Times of Quenching | Remarks |
|---|---|---|
| A | 860 A × 0.8 s × 1 time | Highest Temperature |
| B | 860 A × 0.8 s × 3 times | Reached |
| C | 860 A × 0.8 s × 5 times | 800 A × 0.8 s: 1090° C. |
| D | 860 A × 0.8 s × 1 time + 830 A × 0.8 s × 1 time | 830 A × 0.8 s: 1130° C. |
| E | 860 A × 0.8 s × 1 time + 830 A × 0.8 s × 3 times | 840 A × 0.8 s: 1150° C. |
| F | 860 A × 0.8 s × 1 time + 830 A × 0.8 s × 4 times | 860 A × 0.8 s: 1180° C. |
| G | 860 A × 0.8 s × 1 time + 830 A × 0.8 s × 5 times | |
| H | 860 A × 0.8 s × 1 time + 840 A × 0.8 s × 2 times | |
| I | 860 A × 0.8 s × 1 time + 840 A × 0.8 s × 3 times | |

Figure 51:
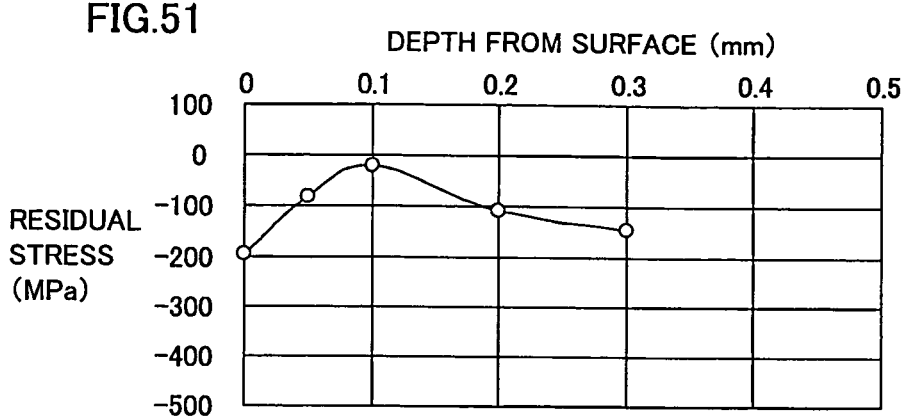
FIG. 51 is a diagram showing residual stress distribution in a test specimen heated to 150° C. to be tempered.

Consequently, it was found that the target hardened layer pattern to be provided to the shaft member above was obtained under condition F in Table 5. In addition, distribution of residual stress in the central portion in the direction of axis around the outer circumferential surface of the test specimen quench-hardened under condition F in Table 5 was examined. In FIG. 51, residual stress is expressed in such a manner that tensile stress is expressed as positive and compressive stress is expressed as negative.

Referring to FIG. 51, compressive stress of approximately 100 MPa remains at the surface portion of the outer circumferential surface of the test specimen quench-hardened under condition F in Table 5. Therefore, it can be said that the surface portion of the test specimen is quench-hardened to a preferable state. An example where a tempering temperature was varied was also examined as in the case of SKD11. Then, it was confirmed that equivalent compressive stress remained regardless of a tempering temperature.

In accordance with the procedure as above, appropriate quenching conditions in the quench-hardening treatment of a shaft member using the induction hardening apparatus according to the present invention can be set.

EXAMPLE 3

Example 3 of the present invention will be described hereinafter. Experiments in which variation in a dimension of a shaft member in quench-hardening treatment of the shaft member using the induction hardening apparatus according to the present invention is examined were conducted. The procedure of the experiments is as follows.

Initially, a cylindrical member having a diameter of 10 mm and a height of 20 mm was prepared as a test specimen. SKD11 and SUS440C defined under JIS were adopted as steel forming test specimens. Then, experiments, in which test specimens made of SKD11 were subjected to quenching treatment once to eleven times under the conditions of a heating time period of 0.9 second and a heating temperature from 1055 to 1145° C. or the conditions of a heating time period of 5 seconds and a heating temperature from 1090 to 1110° C. and test specimens made of SUS440C were subjected to quenching treatment once to eleven times under the conditions of a heating time period of 3 seconds and a heating temperature from 1100 to 1300° C., and then a height of the test specimens after the treatment was measured, were conducted.

Figure 52:
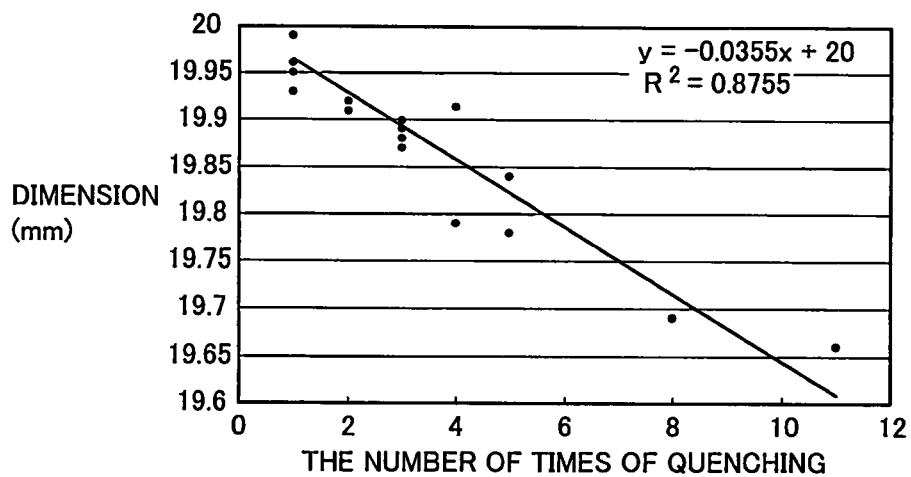
FIG. 52 is a diagram showing results of experiments of test specimens made of SKD11.
Figure 53:
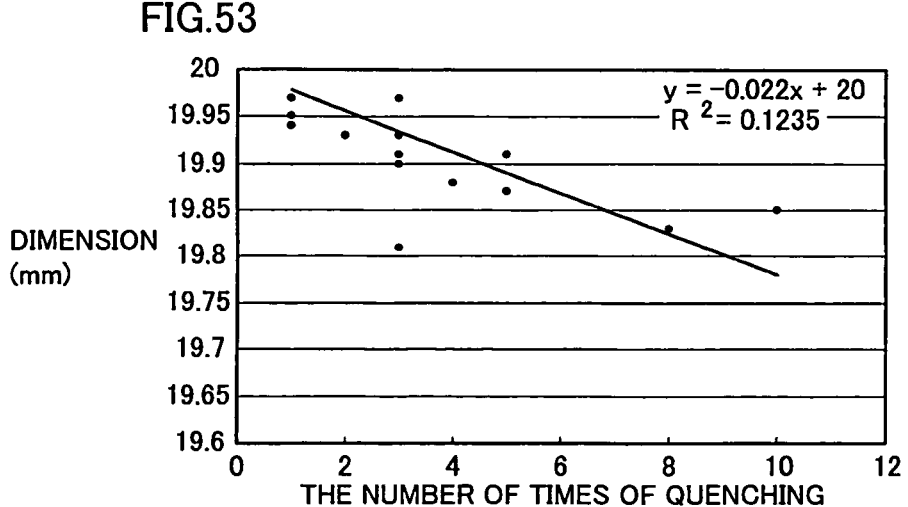
FIG. 53 is a diagram showing results of experiments of test specimens made of SUS440C.

In FIGS. 52 and 53, the abscissa represents the number of times of quenching and the ordinate represents a height of test specimens after quenching treatment. In addition, a straight line in the figures is an approximate straight line obtained from dimension measurement data.

Referring to FIGS. 52 and 53, in any of SKD11 and SUS440C, the dimension in the direction of axis of the test specimens linearly decreases with the increase in the number of times of quenching. Based on this fact, in consideration of variation in a dimension (contraction in the direction of axis) through the quench-hardening treatment, in the method of manufacturing a shaft in which the method of quenching a shaft member according to the present invention is adopted, a shaft member greater in length than a desired axial dimension of the quench-hardened shaft member before plastic working (caulking) is preferably prepared in the step of preparing a shaft member. In particular, in an example where quench-hardening treatment is performed a plurality of times, it is important to prepare a shaft member before quenching in consideration of variation in dimension above.

It should be understood that the embodiments and the examples disclosed herein are illustrative and non-restrictive in every respect. The scope of the present invention is defined by the terms of the claims, rather than the description above, and is intended to include any modifications within the scope and meaning equivalent to the terms of the claims.

Industrial Applicability

The roller follower and the valve train according to the present invention are particularly advantageously applied to a roller follower interposed between a rocker arm and a cam for opening and closing a valve of an engine and arranged in contact with the cam and a valve train including the roller follower. In addition, the shaft as well as the induction hardening apparatus, the method of heat treatment of a shaft member, and the method of manufacturing a shaft according to the present invention are particularly advantageously applied to a shaft used as a shaft of a roller follower, an induction hardening apparatus used for manufacturing a shaft, a method of heat treatment of a shaft member, and a method of manufacturing a shaft.

The invention claimed is:
1. A roller follower interposed between a rocker arm and a cam for opening and closing a valve of an engine and arranged in contact with said cam, comprising:
   an outer ring having an annular shape;
   a shaft arranged such that a rolling contact surface formed on its outer circumferential surface is opposed to a rolling contact surface formed on an inner circumferential surface of said outer ring; and
   a plurality of rolling elements coming in contact, at a rolling contact surface formed on an outer circumferen- tial surface thereof, with the rolling contact surfaces of said outer ring and said shaft and arranged on an annular raceway, at least any one of said outer ring, said shaft and said rolling elements being a steel member made of SUS440C steel defined under JIS containing carbon not lower than 0.7 mass % and not higher than 2.4 mass % and chromium not lower than 10.0 mass % and not higher than 20.0 mass %, with remainder iron and impurities, carbide containing at least any one of iron and chromium as well as carbon and having an area of 12.6 μm² or greater being generated at an area ratio of 6.0% or higher, at said rolling contact surface of said steel member, and the number of carbides each containing at least one of iron and chromium as well as carbon, and each having an area exceeding 530.7 μm² is not more than one when five fields of 120 μm×100 μm in a cross-section perpendicular to the rolling contact surface of the steel are examined.

2. A roller follower interposed between a rocker arm and a cam for opening and closing a valve of an engine and arranged in contact with said cam, comprising:

an outer ring having an annular shape;

a shaft arranged such that a rolling contact surface formed on its outer circumferential surface is opposed to a rolling contact surface formed on an inner circumferential surface of said outer ring; and a plurality of rolling elements coming in contact, at a rolling contact surface formed on an outer circumferential surface thereof, with the rolling contact surfaces of said outer ring and said shaft and arranged on an annular raceway, at least any one of said outer ring, said shaft and said rolling elements being a steel member made of SKD11 steel defined under JIS containing carbon not lower than 0.7 mass % and not higher than 2.4 mass % and chromium not lower than 10.0 mass % and not higher than 20.0 mass % as well as at least one element selected from the group consisting of silicon not higher than 3.5 mass %, manganese not higher than 1.25 mass %, nickel not higher than 2.5 mass %, molybdenum not higher than 10.0 mass %, and vanadium not higher than 5.2 mass %, with remainder iron and impurities, carbide containing at least any one of iron and chromium as well as carbon and having an area of 12.6 μm² or greater being generated at an area ratio of 6.0% or higher, at said rolling contact surface of said steel member, and the number of carbides each containing at least one of iron and chromium as well as carbon, and each having an area exceeding 530.7 μm² is not more than one when five fields of 120 μm×100 μm in a cross-section perpendicular to the rolling contact surface of the steel are examined.

3. The roller follower according to claim 2, wherein
said rolling contact surface of said steel member has hardness not lower than 58 HRC.

4. The roller follower according to claim 2, wherein
an area of said steel member extending from said rolling contact surface to a thickness not greater than 50 μm has hardness not lower than 58 HRC.

5. The roller follower according to claim 3, wherein
said shaft is said steel member and has a hollow shape having a through hole in a direction of axis, and a thickness of the area extending from said rolling contact surface and having hardness not lower than 58 HRC is not greater than ⅓ of a total thickness.

6. The roller follower according to claim 3, wherein
said shaft is said steel member and has a solid shape, and a thickness of the area extending from said rolling contact surface and having hardness not lower than 58 HRC is not greater than ⅓ of a radius in a cross-section perpendicular to said rolling contact surface.

7. The roller follower according to claim 2, wherein
said engine is a diesel engine or a direct-injection gasoline engine.

8. A valve train for opening and closing a valve of an engine by operating a rocker arm, comprising:

the roller follower according to claim 2; and a holding member for holding said roller follower, and said roller follower being fixed to said holding member by a caulked portion formed as a result of plastic deformation of an end portion of said shaft.

9. The valve train according to claim 8, wherein
said caulked portion has hardness not higher than 35 HRC.

10. The valve train according to claim 8, wherein
said caulked portion is formed across an area extending from the end portion of said shaft by 1 mm or greater in a direction of axis.

11. A roller follower interposed between a rocker arm and a cam for opening and closing a valve of an engine and arranged in contact with said cam, comprising:

an outer ring having an annular shape; and a shaft arranged such that a slide surface formed on its outer circumferential surface is opposed to a slide surface formed on an inner circumferential surface of said outer ring, at least any one of said outer ring and said shaft being a steel member made of SUS440C steel defined under JIS containing carbon not lower than 0.7 mass % and not higher than 2.4 mass % and chromium not lower than 10.0 mass % and not higher than 20.0 mass %, with remainder iron and impurities, carbide containing at least any one of iron and chromium as well as carbon and having an area of 12.6 μm² or greater being generated at an area ratio of 6.0% or higher, at said slide surface of said steel member, and the number of carbides each containing at least one of iron and chromium as well as carbon, and each having an area exceeding 530.7 μm² is not maore than one when five fields of 120 μm×100 μm in a cross-section perpendicular to the rolling contact surface of the steel are examined.

12. A roller follower interposed between a rocker arm and a cam for opening and closing a valve of an engine and arranged in contact with said cam, comprising:

an outer ring having an annular shape; and a shaft arranged such that a slide surface formed on its outer circumferential surface is opposed to a slide surface formed on an inner circumferential surface of said outer ring, at least any one of said outer ring and said shaft being a steel member made of SKD11 steel defined under JIS containing carbon not lower than 0.7 mass % and not higher than 2.4 mass % and chromium not lower than 10.0 mass % and not higher than 20.0 mass % as well as at least one element selected from the group consisting of silicon not higher than 3.5 mass %, manganese not higher than 1.25 mass %, nickel not higher than 2.5 mass %, molybdenum not higher than 10.0 mass %, and vanadium not higher than 5.2 mass %, with remainder iron and impurities, carbide containing at least any one of iron and chromium as well as carbon and having an area of 12.6 μm² or greater being generated at an area ratio of 6.0% or higher, at said slide surface of said steel member, and the number of carbides each containing at least one of iron and chromium as well as carbon, and each having an area exceeding 530.7 μm² is not more than one when five fields of 120 μm×100 μm in a cross-section perpendicular to the rolling contact surface of the steel are examined.

13. The roller follower according to claim 12, wherein said slide surface of said steel member has hardness not lower than 58 HRC.

14. The roller follower according to claim 12, wherein an area of said steel member extending from said slide surface to a thickness not greater than 50 μm has hardness not lower than 58 HRC.

15. The roller follower according to claim 13, wherein said shaft is said steel member and has a hollow shape having a through hole in a direction of axis, and a thickness of the area extending from said slide surface and having hardness not lower than 58 HRC is not greater than ⅓ of a total thickness.

16. The roller follower according to claim 13, wherein said shaft is said steel member and has a solid shape, and a thickness of the area extending from said slide surface and having hardness not lower than 58 HRC is not greater than ⅓ of a radius in a cross-section perpendicular to said slide surface.

17. The roller follower according to claim 12, wherein said engine is a diesel engine or a direct-injection gasoline engine.

18. A valve train for opening and closing a valve of an engine by operating a rocker arm, comprising:

the roller follower according to claim 12; and a holding member for holding said roller follower, and said roller follower being fixed to said holding member by a caulked portion formed as a result of plastic deformation of an end portion of said shaft.

19. The valve train according to claim 18, wherein said caulked portion has hardness not higher than 35 HRC.

20. The valve train according to claim 18, wherein said caulked portion is formed across an area extending from the end portion of said shaft by 1 mm or greater in a direction of axis.

\* \* \* \* \*